United States Patent
Gettinger et al.

(10) Patent No.: US 12,471,895 B2
(45) Date of Patent: Nov. 18, 2025

(54) DEVICES AND METHODS FOR PERFORMING VASCULAR HEMOSTASIS

(71) Applicant: TERUMO MEDICAL CORPORATION, Somerset, NJ (US)

(72) Inventors: Sarah Elizabeth Gettinger, West Chester, PA (US); Kevin Douglas Ridgley, Newark, DE (US); Brian David Hoffman, Princeton, NJ (US)

(73) Assignee: TERUMO MEDICAL CORPORATION, Somerset, NJ (US)

( * ) Notice: Subject to any disclaimer, the term of this patent is extended or adjusted under 35 U.S.C. 154(b) by 248 days.

(21) Appl. No.: 17/686,339

(22) Filed: Mar. 3, 2022

(65) Prior Publication Data

US 2022/0280143 A1 Sep. 8, 2022

Related U.S. Application Data

(60) Provisional application No. 63/156,861, filed on Mar. 4, 2021.

(51) Int. Cl.
*A61B 17/00* (2006.01)

(52) U.S. Cl.
CPC ............... *A61B 17/0057* (2013.01); *A61B 2017/00654* (2013.01)

(58) Field of Classification Search
CPC ........... A61B 2017/00654; A61B 2017/00637; A61B 2017/0065
See application file for complete search history.

(56) References Cited

U.S. PATENT DOCUMENTS

| | | | |
|---|---|---|---|
| 4,836,204 A | 6/1989 | Landymore et al. | |
| 5,419,765 A * | 5/1995 | Weldon | A61B 17/0057 604/60 |
| 5,645,566 A | 7/1997 | Brenneman et al. | |
| 5,725,551 A | 3/1998 | Myers et al. | |
| 5,728,134 A | 3/1998 | Barak | |

(Continued)

FOREIGN PATENT DOCUMENTS

| | | |
|---|---|---|
| JP | H07-227423 A | 8/1995 |
| JP | 2001-506510 A | 5/2001 |

OTHER PUBLICATIONS

International Preliminary Report on Patentability in corresponding PCT Application No. PCT/US2022/018804, dated Aug. 29, 2023.

(Continued)

*Primary Examiner* — Alexander J Orkin
(74) *Attorney, Agent, or Firm* — Foley & Lardner LLP

(57) ABSTRACT

A system for performing vascular hemostasis comprises a balloon insertable into a tissue track so as to be disposed outside a vessel above an opening formed in the vessel. A hemostasis layer is removably disposed on at least a portion of an outer surface of the balloon. A balloon tube is fluidly coupled to the balloon and configured to selectively inflate or deflate the balloon. The balloon is inflatable above the opening such that the hemostasis layer is disposed on the outer surface of the vessel and closes the opening. The hemostasis layer is separable from the balloon so as to remain disposed on the outer surface of the vessel when the balloon is removed from the tissue track, and continues to close the opening after removal of the balloon.

10 Claims, 20 Drawing Sheets

(56) References Cited

U.S. PATENT DOCUMENTS

| | | | |
|---|---|---|---|
| 5,776,097 A * | 7/1998 | Massoud | A61B 17/12186 606/192 |
| 5,957,952 A | 9/1999 | Gershony et al. | |
| 6,017,359 A | 1/2000 | Gershony et al. | |
| 6,048,358 A | 4/2000 | Barak | |
| 6,063,085 A * | 5/2000 | Tay | A61B 17/0057 606/50 |
| 6,322,580 B1 * | 11/2001 | Kanner | A61B 17/0057 606/213 |
| 6,669,711 B1 | 12/2003 | Noda | |
| 6,743,195 B2 | 6/2004 | Zucker | |
| 6,846,321 B2 | 1/2005 | Zucker | |
| 6,863,680 B2 | 3/2005 | Ashby | |
| 8,372,072 B2 | 2/2013 | Lindenbaum et al. | |
| 8,617,204 B2 | 12/2013 | Khosravi et al. | |
| 9,603,588 B2 | 3/2017 | Kramer et al. | |
| 2001/0031948 A1 * | 10/2001 | Cruise | A61L 24/043 604/191 |
| 2002/0022822 A1 * | 2/2002 | Cragg | A61B 17/0057 604/500 |
| 2002/0062104 A1 * | 5/2002 | Ashby | A61B 17/0057 604/93.01 |
| 2002/0156495 A1 | 10/2002 | Brenneman et al. | |
| 2003/0158578 A1 * | 8/2003 | Pantages | A61B 17/0057 606/213 |
| 2005/0085856 A1 * | 4/2005 | Ginn | A61B 17/0057 606/213 |
| 2005/0274768 A1 * | 12/2005 | Cummins | A61B 17/0644 227/175.1 |
| 2006/0116635 A1 | 6/2006 | Shabty et al. | |
| 2007/0021770 A1 | 1/2007 | Brenneman et al. | |
| 2008/0065150 A1 * | 3/2008 | Drasler | A61B 17/0057 606/213 |
| 2010/0168767 A1 * | 7/2010 | Yassinzadeh | A61B 17/0057 606/139 |
| 2010/0261962 A1 * | 10/2010 | Friedberg | A61B 1/00082 600/114 |
| 2010/0280546 A1 * | 11/2010 | Campbell | A61B 17/0057 606/213 |
| 2011/0166595 A1 * | 7/2011 | Vidlund | A61B 17/12136 606/213 |
| 2012/0245517 A1 | 9/2012 | Tegels | |
| 2013/0261660 A1 | 10/2013 | Mckay | |
| 2013/0304118 A1 | 11/2013 | Rakvica et al. | |
| 2014/0257359 A1 * | 9/2014 | Tegels | A61B 17/0057 606/194 |
| 2016/0074024 A1 | 3/2016 | Scheule | |
| 2018/0193010 A1 | 7/2018 | Riebman et al. | |
| 2019/0015086 A1 | 1/2019 | Blumenthal | |

OTHER PUBLICATIONS

International Search Report and Written Opinion in corresponding PCT Application No. PCT/US2022/018804, mailed Jun. 23, 2022.
Notice of Reason(s) for Rejection in corresponding Japanese Application No. 2023-553658, dated Jul. 9, 2024 with English language translation.
Notice of Reason(s) for Rejection in corresponding Japanese Application No. 2023-553658, dated Oct. 29, 2024.

* cited by examiner

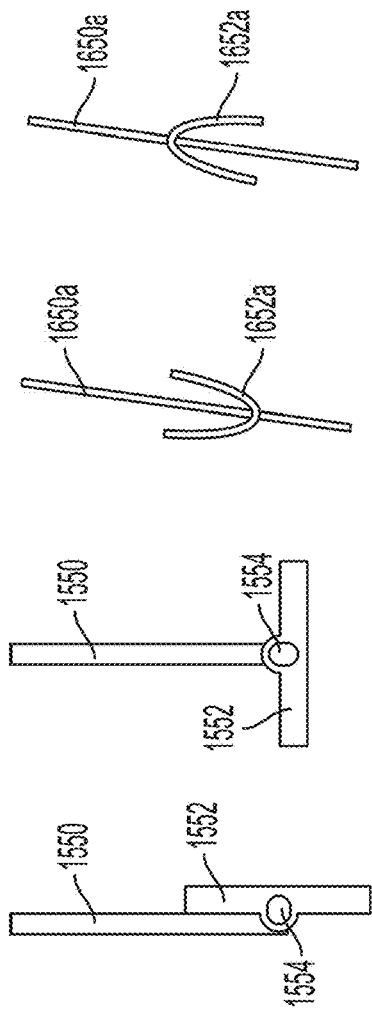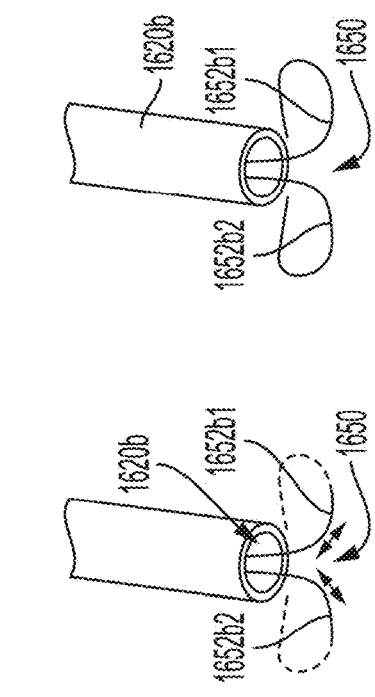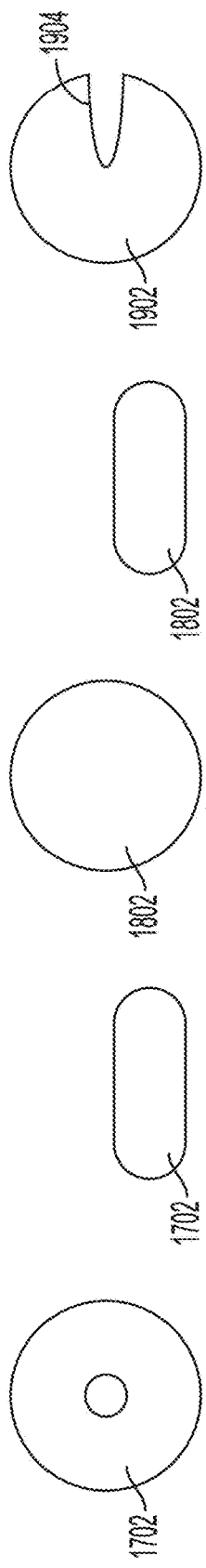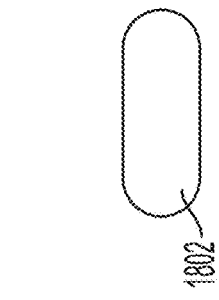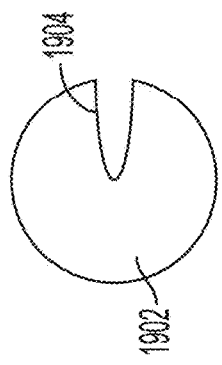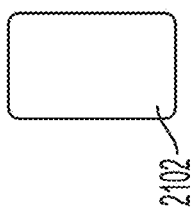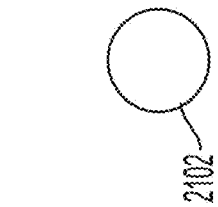

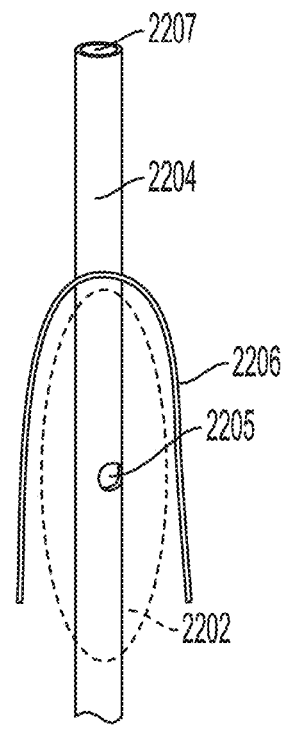
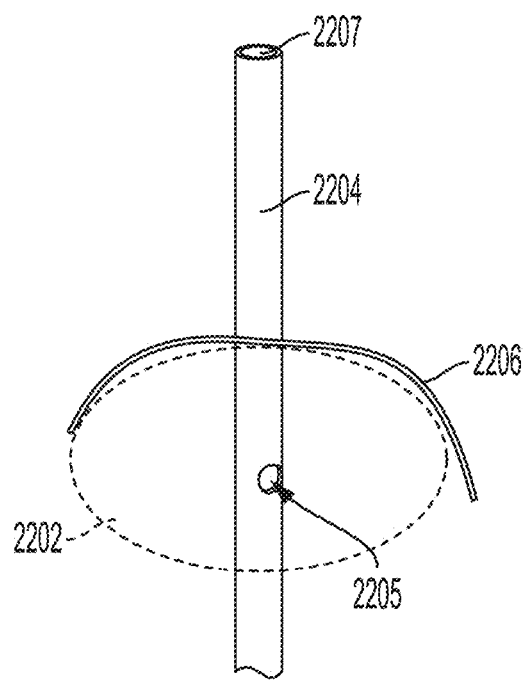
FIG. 22A  FIG. 22B
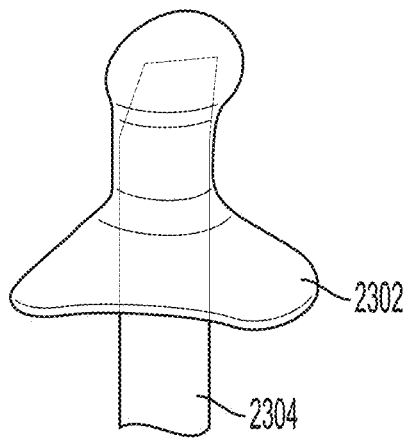
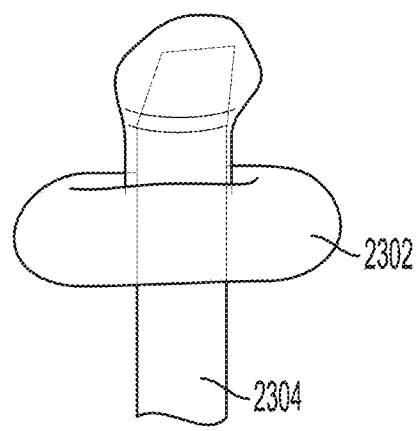
FIG. 23A  FIG. 23B

DEVICES AND METHODS FOR PERFORMING VASCULAR HEMOSTASIS

CROSS-REFERENCE TO RELATED APPLICATIONS

The present disclosure claims the benefit of and priority to U.S. Provisional Application No. 63/156,861, filed Mar. 4, 2021, the disclosure of which is incorporated herein by reference in its entirety.

TECHNICAL FIELD

The present disclosure relates generally to devices and methods of performing vascular hemostasis using inflatable balloons without leaving any structure within a vessel after achieving hemostasis.

BACKGROUND

Vascular trauma such as arterial or venous trauma can result in rapid blood loss, and can prove fatal if blood flow is not stopped in a rapid fashion by performing vascular hemostasis, i.e., closing and repairing the opening in the vessel from which blood is leaking such that the cardiovascular system can regain its normal function of providing blood to various parts of the body at normal blood pressure. Conventionally, hemostasis is achieved by applying manual compression at a location of a patient's body over the skin of the patient, but is not very effective in closing the opening and can take a relatively long time in achieving hemostasis, if at all. Moreover, manual compression requires patients to lay flat for hours, delays the ambulation time, i.e., the point at which the patient can get up and walk around, and is generally uncomfortable for the patient. Vascular closure devices ("VCDs") have been used to rapidly achieve hemostasis. Such devices generally have an intravascular component (i.e., located within the vessel) and an extravascular component (i.e., located outside the vessel). While having an intravascular component and an extravascular component may achieve rapid hemostasis, the intravascular component generally remains within the vessel after hemostasis is achieved. Such intravascular components pose the risk of detaching from the wall of vessel and causing an embolic event.

SUMMARY

Embodiments described herein relate generally to devices and methods for performing extravascular vascular hemostasis, and in particular to using inflatable balloons to provide extravascular compression on an opening in a vessel to achieve hemostasis. A hemostasis layer can be separably disposed on the balloon such that the balloon causes the hemostasis layer to be disposed on, and close the opening of the vessel and remains on the outer surface of the vessel once the balloon is removed. Secondary balloons or anchors may be used to provide intravascular support when disposing the balloon and the hemostasis layer on the outer surface of the vessel, but are removed from within the vessel once hemostasis is achieved.

In some embodiments, a device for performing vascular hemostasis comprises: a first balloon insertable into a tissue track so as to be disposed outside a vessel above an opening formed in the vessel; a hemostasis layer removably disposed on at least a portion of an outer surface of the first balloon; and a first balloon tube fluidly coupled to the first balloon and configured to selectively inflate or deflate the first balloon, wherein the first balloon is inflatable above the opening such that the hemostasis layer is disposed on the outer surface of the vessel and closes the opening, and the first balloon exerts pressure on the opening to achieve hemostasis, the hemostasis layer being separable from the first balloon so as to remain disposed on the outer surface of the vessel when the first balloon is removed from the tissue track and to continue to close the opening after removal of the first balloon.

In some embodiments, the device further comprises: a carrier tube defining at least one lumen through which the first balloon, the hemostasis layer, and the balloon tube are disposed.

In some embodiments, the device further comprises: a sheath defining a central channel through which the first balloon, the hemostasis layer, the first balloon tube, and the carrier tube are disposed, wherein at least a portion of the sheath is configured to be removably insertable into the tissue track and the vessel.

In some embodiments, a distal end of at least one of the sheath or the carrier tube is perforated so as to allow the distal end to tear at the perforations when the first balloon is inflated within the distal end.

In some embodiments, the hemostasis layer is formed of a resorbable material.

In some embodiments, the device further comprises: a first guide wire extending through or adjacent to the first balloon, a distal end of the first guide wire configured to be removably disposed through the opening within the vessel before disposing the first balloon over the opening.

In some embodiments, the device comprises: a second balloon configured to be removably disposed through the opening within the vessel such that when each of the first balloon and the second balloon are inflated, a wall of the vessel and the hemostasis layer are interposed between the first balloon and the second balloon, thereby facilitating securing of the hemostasis layer on the outer surface of the vessel.

In some embodiments, second balloon is axially offset from the first balloon.

In some embodiments, the device further comprises: a second balloon tube fluidly coupled to the second balloon, the second balloon tube configured to selectively inflate or deflate the second balloon.

In some embodiments, the device further comprises: a carrier tube defining: a first lumen through which the first balloon tube and the first balloon are disposed, and a second lumen axially offset from the first lumen, the second balloon tube and the second balloon being disposed through the second lumen.

In some embodiments, the device further comprises: a second guide wire extending through or adjacent to the second balloon, a distal end of the second guide wire configured to be removably disposed in the vessel before disposing the second balloon within the vessel.

In some embodiments, the second balloon is axially aligned with the first balloon.

In some embodiments, the device further comprises: a second balloon tube fluidly coupled to the second balloon and configured to selectively inflate or deflate the second balloon, the second balloon tube disposed through the first balloon tube.

In some embodiments, the second balloon is axially aligned with the first balloon.

In some embodiments, the device further comprises: a second balloon tube fluidly coupled to the second balloon and configured to selectively inflate or deflate the second balloon, the second balloon tube disposed through the first balloon tube.

In some embodiments, the device further comprises: a carrier tube defining a lumen through which each of the first balloon tube, the first balloon, the second balloon tube and the second balloon are disposed.

In some embodiments, the device further comprises: an anchor wire having an anchor wire distal end configured to be disposed through the opening into the vessel, the anchor wire distal end movable between a contracted configuration when the anchor wire distal end is disposed outside the vessel and an expanded configuration when the anchor wire distal end is disposed within the vessel, wherein in the expanded configuration, the anchor wire distal end forms an anchor such that a wall of the vessel and the hemostasis layer are interposed between the first balloon and the anchor when the first balloon is inflated, thereby facilitating securing of the hemostasis layer on the outer surface of the vessel.

In some embodiments, the anchor wire is formed of a shape memory alloy, the anchor wire being in a relaxed state in the expanded configuration when no force is applied on the anchor wire distal end.

In some embodiments, the anchor wire is axially offset from the first balloon.

In some embodiments, the anchor wire is axially aligned with the first balloon such that anchor wire is disposed through the first balloon.

In some embodiments, a method for performing vascular hemostasis, comprises: inserting a first balloon through a tissue track towards an opening formed in a vessel using a first balloon tube fluidly coupled to the first balloon such that the first balloon is disposed proximate to an opening formed in a vessel; inflating the first balloon such that a distal end of the first balloon presses against an outer surface of a wall of the vessel and closes the opening; maintaining the first balloon in the inflated position for a time period; deflating the first balloon after the time period; withdrawing the first balloon tube and, thereby the first balloon out of the vessel.

In some embodiments, a hemostasis layer is disposed on at least a portion of an outer surface of the first balloon, wherein inflating the first balloon causes the hemostasis layer to be interposed between the outer surface of the wall of the vessel and the inflated first balloon such that the hemostasis layer closes the opening, and deflating the first balloon after the time period causes the hemostasis layer to separate from the outer surface of the first balloon such that the hemostasis layer remains disposed on the outer surface of the vessel and continues to close the opening once the first balloon is removed from the tissue track.

In some embodiments, the method further comprises: before inserting the first balloon through the tissue track, inserting a first guide wire through the tissue track until a distal end of the first guide wire is disposed through the opening into the vessel, the first balloon inserted over or adjacent to the first guide wire towards the vessel; and before removing the first balloon from the tissue track, removing the first guide wire from the tissue track.

In some embodiments, the method further comprises: before inflating the first balloon, inserting a second balloon through the opening into the vessel using a second balloon tube, inflating the second balloon within the vessel before the first balloon is inflated such that when the first balloon is inflated, the wall of the vessel is interposed between the first balloon and the second balloon; deflating the second balloon while the first balloon is still inflated; and withdrawing the second balloon from the vessel.

In some embodiments, the second balloon is axially offset from the first balloon.

In some embodiments, the method further comprises: before inserting the first balloon and the second balloon, inserting a sheath through the tissue track over the first guide wire such that a portion of the sheath is inserted through the opening formed in the vessel into the vessel, the sheath defining a central channel through which the first balloon tube with the first balloon, and the second balloon tube with the second balloon are inserted towards the vessel; withdrawing the sheath until a sheath distal end of the sheath is disposed outside the vessel proximate to the opening; after inflating the second balloon, withdrawing the sheath a second distance without withdrawing the first balloon such that the first balloon is disposed outside the central channel proximate to the opening.

In some embodiments, the method further comprises: before inserting the first balloon and the second balloon, inserting a carrier tube through the central channel defined by the sheath towards the vessel such that a distal end of the carrier tube is proximate to an opening formed in a vessel, the carrier tube defining: a first lumen through which the first balloon tube and the first balloon are inserted, and a second lumen axially offset from the first lumen, the second balloon tube and the second balloon being inserted through the second lumen, wherein carrier tube is withdrawn from the vessel along with the sheath.

In some embodiments, the first balloon is disposed in a first lumen defined by a carrier tube, and the second balloon is disposed in a second lumen defined by the carrier tube, and inserting the first balloon and the second balloon comprises inserting the carrier tube through the central channel defined by the sheath towards the vessel such that a distal end of the carrier tube is proximate to the opening formed in the vessel.

In some embodiments, the method further comprises: before inserting the second balloon into the vessel, inserting a second guide wire through the opening into the vessel, the second guide wire extending through or adjacent to the second balloon.

In some embodiments, the second balloon is axially aligned with the first balloon.

In some embodiments, the second balloon tube is disposed through the first balloon tube.

In some embodiments, the method further comprises: before inserting the first balloon and the second balloon, inserting a sheath through the tissue track over the first guide wire such that a portion of the sheath is inserted through the opening formed in the vessel into the vessel, the sheath defining a central channel through which the first balloon tube with the first balloon, and the second balloon tube with the second balloon tube are inserted towards the vessel; withdrawing the sheath until a sheath distal end of the sheath is disposed outside the vessel proximate to the opening; and after inflating the second balloon, withdrawing the sheath a second distance without withdrawing the first balloon such that the first balloon is disposed outside the central channel proximate to the opening.

In some embodiments, the method further comprises: before inserting the first balloon and the second balloon, inserting a carrier tube through the central channel defined by the sheath towards the vessel such that a distal end of the carrier tube is proximate to an opening formed in a vessel, the carrier tube defining: a lumen through which each of the first balloon tube with the first balloon and the second balloon tube with the second balloon are inserted.

In some embodiments, each of the first balloon and the second balloon are disposed in a lumen defined by a carrier tube, and inserting the first balloon and the second balloon comprises inserting the carrier tube through the central channel defined by the sheath towards the vessel such that a distal end of the carrier tube is proximate to the opening formed in the vessel.

In some embodiments, the method further comprises: before inflating the first balloon, inserting an anchor wire distal end of an anchor wire through the opening into the vessel, the anchor wire distal end being in a contracted configuration before being inserted through the opening, and the anchor wire distal end being in an expanded configuration to form an anchor after being inserted into the vessel such that when the first balloon is inflated, a wall of the vessel is interposed between the first balloon and the anchor; and withdrawing the anchor wire from the vessel while the first balloon is still inflated by moving the anchor wire distal end into the contracted configuration.

In some embodiments, a hemostasis layer is disposed on at least a portion of an outer surface of the first balloon, inflating the first balloon causes the hemostasis layer and the wall of the vessel to be interposed between the inflated first balloon and the anchor such that the hemostasis layer closes the opening, and deflating the first balloon after the time period causes the hemostasis layer to separate from the outer surface of the first balloon such that the hemostasis layer remains disposed on the outer surface of the vessel and continues to close the opening once the first balloon is removed from the tissue track.

In some embodiments, the anchor wire is formed of a shape memory alloy, the anchor wire being in a relaxed state in the expanded configuration when no force is applied on the anchor wire distal end.

In some embodiments, the anchor wire is axially offset from the first balloon.

In some embodiments, the anchor wire is axially aligned with the first balloon such that anchor wire is disposed through the first balloon.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 15A is a side view of an anchor for use in a VCD in a first configuration, and FIG. 15B shows the anchor in a second configuration, according to an embodiment.

FIG. 16A1 is a side view of an anchor for use in a VCD in a first configuration, and FIG. 16A2 shows the anchor in a second configuration, according to an embodiment.

FIG. 16B1 is a side view of an anchor wire that forms an anchor for use in a VCD in a first configuration, and FIG. 16B2 shows the anchor wire in a second configuration, according to an embodiment.

FIGS. 17A-21B show top views and side views of various extravascular balloons for use with VCDs, according to various embodiments.

FIG. 22A shows a side perspective view of a balloon tube fluidly coupled to a balloon with the balloon in a deflated configuration, and FIG. 22B shows the perspective view of the balloon in an inflated configuration, according to an embodiment.

FIG. 23A shows a side view of a portion of a balloon tube fluidly coupled to a balloon with the balloon in a deflated configuration, and FIG. 23B shows the balloon in an inflated configuration, according to an embodiment.

Figure 1:
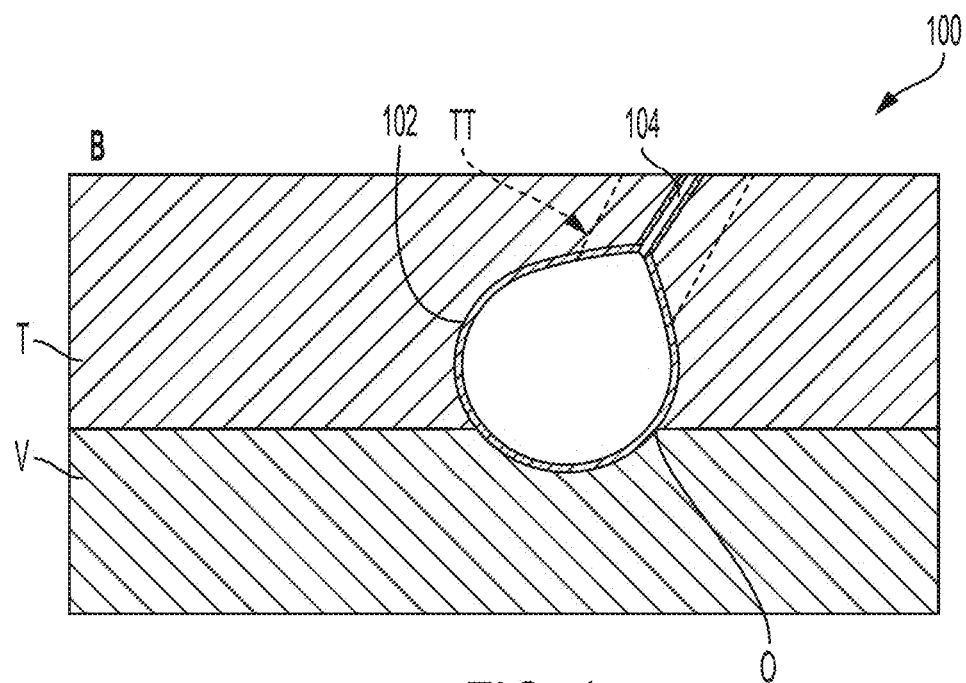
FIG. 1 is a schematic illustration of a portion of a VCD for achieving vascular hemostasis that includes a sheath, a balloon tube, and a balloon, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to devices and methods for performing extravascular vascular hemostasis, and in particular to using inflatable balloons to provide extravascular compression on an opening in a vessel to achieve hemostasis. A hemostasis layer can be separably disposed on the balloon such that the balloon causes the hemostasis layer to be disposed on, and close the opening of the vessel and remain on the outer surface of the vessel once the balloon is removed. Secondary balloons or anchors may be used to provide intravascular support when disposing the balloon and the hemostasis layer on the outer surface of the vessel, but are removed from within the vessel once hemostasis is achieved.

Embodiments of the devices and methods described herein may provide one or more benefits including, for example: (1) allowing vascular closure by performing extravascular compression on an opening formed in the vessel, thereby achieving hemostasis more rapidly relative to manual compression and compression devices; (2) achieving hemostasis and vascular closure without leaving an intravascular component within the vessel; (3) allowing positioning of a hemostasis layer on an outer surface of the vessel to maintain vascular closure even after the extravascular balloon used to apply compression is removed; and (4) reducing the risk of an embolic event, thereby reducing the possibility of complications post procedure or death.

As described herein the term "proximal end" refers to and that is proximate to a user of a VCD and the term "distal end" refers to an end that is distal from a user of the VCD and proximate to a subject on which a vascular closure procedure is being performed using the VCD.

Figure 2:
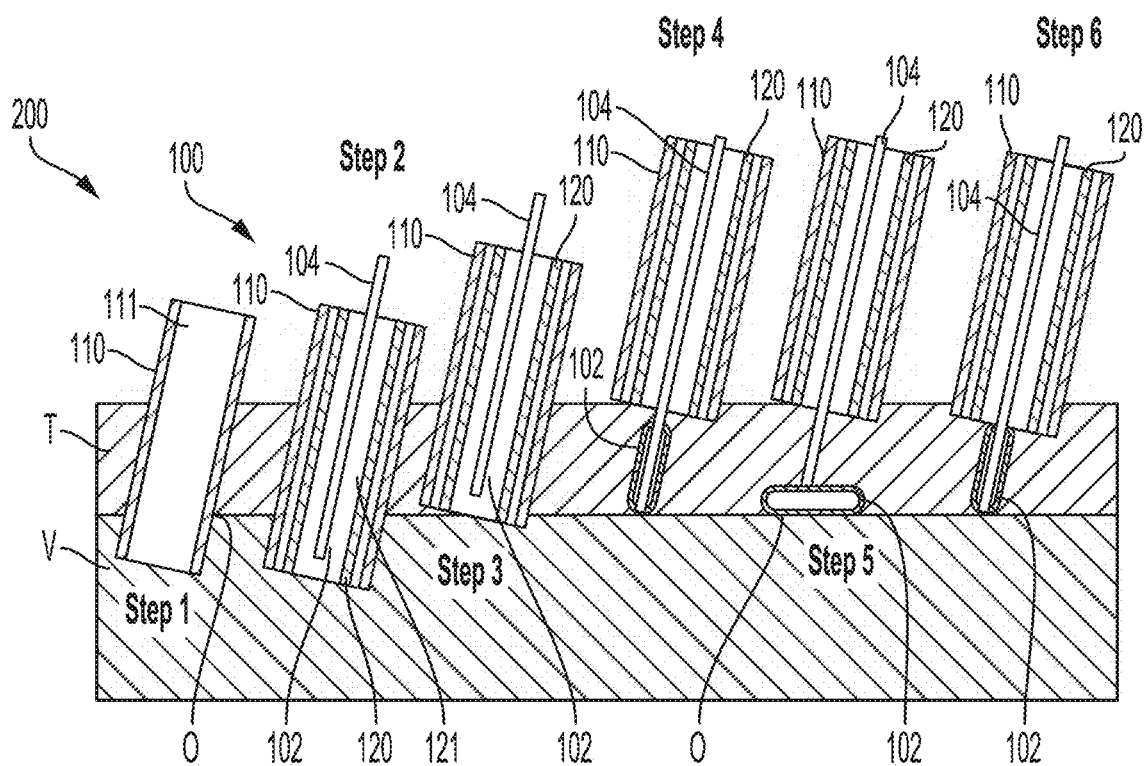
FIG. 2 illustrates a method for performing vascular hemostasis using a VCD that includes the portion shown in FIG. 1.

Referring to FIGS. 1 and 2, a VCD 100 for achieving extravascular vascular hemostasis is shown, according to an embodiment. The VCD 100 includes a balloon 102, a balloon tube 104, and may optionally include a sheath 110, and a carrier tube 120.

FIG. 1 shows a vessel V located within a tissue T of a person or an animal. The vessel V may include an artery (e.g., femoral artery, tibial artery, pedal artery, etc.) or a vein that has an opening O. The opening O may have been formed, for example, because of a surgical procedure. Blood may leak out of the opening O leading to blood loss and even death if the opening O is not closed rapidly to achieve hemostasis.

A tissue track TT may be formed in the tissue T (e.g., via a surgical procedure) to provide access to the underlying vessel V and the opening O formed therein. For example, before a surgical procedure is performed, a physician may gain access to the underlying vessel V by inserting a needle and sheath through the tissue T to form the tissue track TT. The balloon 102 is inserted through the tissue track TT towards the vessel V via the balloon tube 104 until a portion of the balloon 102 is proximate to the opening O outside the vessel V. The balloon tube 104 is fluidly coupled to the balloon 102 and configured to selectively inflate or deflate the balloon 102. The balloon 102 is inflated using a gas (e.g., air, oxygen or any other suitable gas inserted into balloon 102 via the balloon tube 104), or a liquid (e.g., water, a radio opaque inflation fluid, blood, plasma, saline, contrast fluid, etc.) above the opening O such that a portion of the balloon 102 contacts an outer surface of a wall of the vessel V and closes the opening O by applying compression to the opening O. In this manner, the balloon 102 provides vascular closure. The balloon 102 may be maintained in the inflated position for a time sufficient to obtain hemostasis and vascular closure (e.g., 1 min, 2 min, 5 min, 10 min, 20 min, inclusive or any other suitable time as desired).

The balloon 102 may be formed from any suitable material, for example, nylon, polyethylene terephthalate, polyurethane, silicones, polymers, PEBAX, or a combination thereof. The balloon 102 may be coupled to the balloon tube 104 via welding, fusion bonding, crimping (e.g., via a swage band), mechanical coupling (e.g., interlocking or folding), or an adhesive. Location of the balloon 102 within the vessel V may be established before, or after insertion of the balloon 102 through the tissue track TT, for example, via the sheath 110, via user manipulation, or via blood flashback (i.e., back flow) into the balloon tube 104, the carrier tube 120, the sheath 110, or a separate locator. In some embodiments, a guide wire (not shown) may extend through a center of or adjacent to the balloon 102. In some embodiments, the guide wire may include a retractable structure (e.g., retractable plate) that can be used to establish the location of the balloon 102 within the tissue track TT, i.e., whether the balloon 102 is located proximate to the outer surface of the wall of the vessel V outside the opening O. In other arrangements, the sheath 110 may be used to establish location. In some embodiments, the balloon 102 may resemble a percutaneous transluminal angioplasty balloon (e.g., fixed around a central guide wire.) In other embodiments, the balloon 102 could be disposed and delivered over a wire, adjacent to a wire, on a wire, or distal to a wire.

In various embodiments, an outer surface of the balloon 102 may be coated with a non-stick coating to prevent the balloon 102 from sticking to the outer surface of the vessel V around the opening O. Any suitable non-stick coating may be used (e.g., a hydrophobic coating, an oleophilic coating, a nanoparticle coating, a hydrophilic coating, a PTFE coating, a fluoropolymer coating, etc.). The non-stick coating may facilitate detachment of the balloon 102 from the outer surface of the vessel V once hemostasis is achieved and the balloon 102 is deflated for removal from the tissue track TT. This may prevent blood clot that forms in the opening O and closes the opening O, from being removed with the balloon 102, thereby inhibiting reopening of the opening O during removal of the balloon 102.

In some embodiments, the balloon 102 may have a cross-sectional width or diameter in the inflated configuration which does not significantly widen the tissue track TT but is still sufficient to close the opening O, and may be sufficiently large so as to prevent the inflated balloon 102 from being inserted through the opening O into the vessel V. In some embodiments, the balloon 102 may have a diameter that is 1×-2× a diameter of the sheath 110 in the inflated position of the balloon 102. In various embodiments, the sheath 110 may have a diameter in a range of 2 mm to 10 mm, inclusive, and the balloon 102 has a diameter in the inflated position in a range of 2 mm to 20 mm, inclusive.

The balloon tube 104 may be formed from any suitable material, for example, metals, plastics, polymers (e.g., high density polyethylene (HDPE), Pebax, nylon, polycarbonate, polyurethane, acrylonitrile butadiene styrene, etc.) The balloon tube 104 may have an inner diameter in a range of 0.2 mm to 1 mm, inclusive, and an outer diameter in a ranger of 0.3 mm to 2 mm, inclusive. In some embodiments, the balloon tube 104 may be coated with a lubricant or non-stick coating such as, for example, MDX, silicone, etc. In some embodiments, a wall thickness of balloon tube 104 may be in a range of 0.1 mm to 2.5 mm, inclusive (e.g., in embodiments in which the balloon tube includes a single lumen.) In some embodiments, the balloon tube 104 or any other balloon tube described herein may define multiple lumens to allow for a fluid (e.g., an air channel to inflate the balloon 102), and another lumen to pass a guide wire (not shown.) A port may be defined in a sidewall or at an axial end of the balloon tube 104 through which the fluid may be communicated into the balloon 102 to inflate the balloon 102.

The sheath 110 can be formed from metal, plastics, polymers, or any other suitable biocompatible material, or combination thereof, and is insertable into the tissue track TT. The carrier tube 120 may be insertable through a central channel 111 defined by the sheath 110 and may define a lumen 121 through which the balloon tube 104 and, thereby the balloon 102 can be inserted towards the opening O of the vessel V. In some embodiments, the sheath 110 may not be used and the carrier tube 120 is disposed directly through the tissue track TT. In some embodiments, the sheath 110 may include a product (e.g., a procedure sheath) that is already present in the tissue track TT, and the carrier tube 120 inserted through the product towards the vessel V. In various embodiments, a securing mechanism, for example, a clip, a clamp, or a collar may be coupled to the sheath 110 and configured to secure the sheath 110 in place once the sheath 110 is disposed at a desired location (e.g., by coupling the securing mechanism to the tissue T.)

FIG. 2 illustrates an example method 200 for using the VCD 100 to achieve vascular hemostasis. The method 200 includes inserting the sheath 110 through the tissue track formed in the tissue such that a portion (e.g., a sheath distal end) of the sheath 110 is inserted through the opening O of the vessel V into the vessel V, at step 1. At step 2, the carrier tube 120 having the balloon 102 and the balloon tube 104 disposed within the lumen 121 of the carrier tube 120 is inserted into the central channel 111 defined by the sheath 110 until a carrier tube distal end of the carrier tube 120 is located proximate to the sheath distal end. In some embodiments, the carrier tube 120 may not be used and the balloon 102 may be directly inserted through the central channel 111 of the sheath 110 via the balloon tube 104. In other embodiments, the sheath 110 may not be used and the carrier tube 120 may be inserted directly through the tissue track. In still other embodiments, neither the carrier tube 120 nor the sheath 110 is used and the balloon 102 may be inserted through the tissue track towards the opening O via the balloon tube 104 fluidly coupled to the balloon 102.

At step 3, the sheath 110 along with the carrier tube 120 is withdrawn from the tissue track along with the carrier tube 120 and the balloon 102 until the sheath distal end is disposed outside the vessel V proximate to the opening O. A user may determine that the sheath distal end is located outside the vessel V at a desired location by, for example, withdrawing the sheath 110 a predetermined distance out of the tissue track, feel a difference in pressure, receive haptic feedback from the sheath 110 (e.g., via a manual sensing or via a haptic feedback sensor located at the sheath distal end, that may indicate to the user that the sheath 110 is located outside the vessel V at a desired location), or via blood flashback from the sheath 110. In this manner, the sheath 110 may help locate the balloon 102 at the desired location outside the vessel V proximate to the opening O.

At step 4, the sheath 110 along with the carrier tube 120 is withdrawn from the tissue track TT, without withdrawing the balloon 102, for example, a sufficient distance such that sheath 110 and/or the carrier tube 120 are no longer covering a distal end of the balloon tube 104 and thereby, the balloon 102, or out of the tissue track TT such that the balloon 102 is disposed outside the central channel 111 and the lumen 121 proximate to the opening O. At step 5, the balloon 102 is inflated (e.g., via a fluid such as saline, contrast solution, or air communicated into the balloon via the balloon tube 104) outside the vessel V above the opening such that a distal end of the balloon 102 presses against an outer surface of the wall of the vessel V and closes the opening O. Inflation may be performed manually or via a computer controlled pump. The balloon 102 is maintained in the inflated position for the time period (e.g., sufficient to cause a blood clot to form that closes the opening O and facilitates hemostasis.) At step 6, the balloon 102 is deflated, for example, by withdrawing the fluid from the balloon 102 via the balloon tube 104. The balloon 102 is then removed from the tissue track TT, for example, by withdrawing the balloon tube 104 and thereby the deflated balloon 102 away from the vessel V into the carrier tube 120.

In some embodiments, the balloon 102 may be formed from a resorbable material. In such embodiments, the balloon 102 may be separated from the balloon tube 104 after hemostasis is achieved in the inflated or the deflated position, and left on the outer surface of the vessel V to continue to close the opening O once the balloon tube 104 is removed. Over time the balloon 102 is resorbed into the tissue T.

Figure 3:
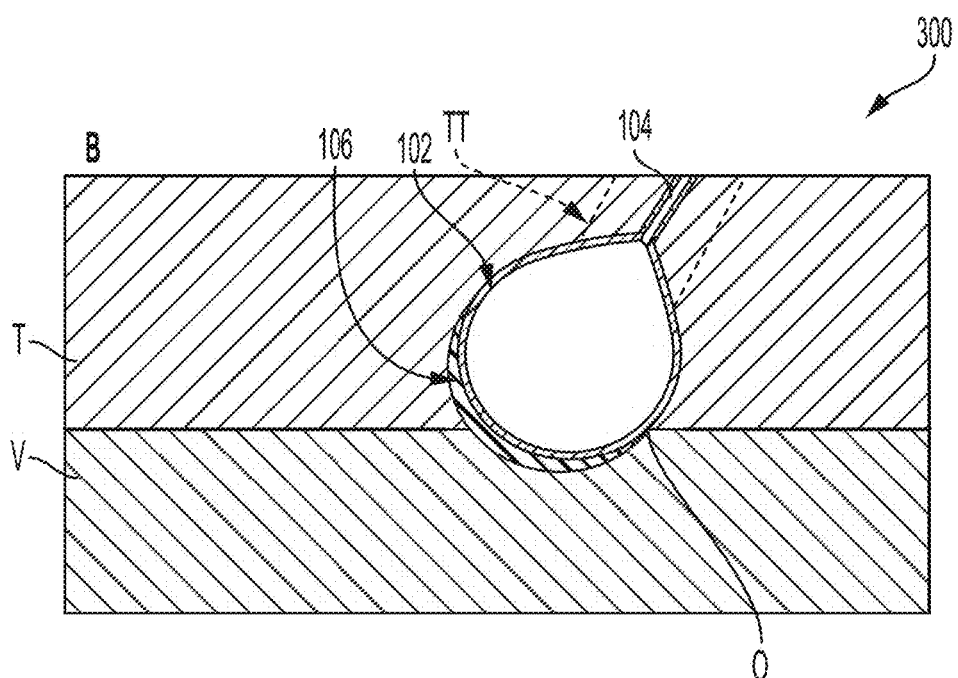
FIG. 3 is a schematic illustration of a portion of a VCD for achieving extravascular vascular hemostasis that includes a sheath, a balloon tube, a balloon, and a hemostasis layer, according to an embodiment.

In some embodiments, a VCD may include a hemostasis layer. Referring now to FIGS. 3-4, a VCD 300 is shown, according to an embodiment. The VCD 300 is substantially similar to the VCD 100 and includes the balloon 102, the balloon tube 104, any may also include the sheath 110 and the carrier tube 120. However, different from the VCD 100, a hemostasis layer 106 is removably disposed on at least a portion of an outer surface of the balloon 102.

The hemostasis layer 106 is structured such that when the balloon 102 is inflated over the opening O, the hemostasis layer 106 is disposed on the outer surface of the wall of the vessel V and closes the opening O because of pressure applied by the balloon 102 on the opening O which promotes clot formation on the hemostasis layer 106. The hemostasis layer 106 is separable from the balloon 102 such that the hemostasis layer 106 remains disposed on the outer surface of the vessel V when the balloon 102 is removed from the tissue track TT. In this manner, the hemostasis layer 106 continues to close the opening O even after removal of the balloon 102 from the tissue track TT.

The hemostasis layer 106 is formed from a biocompatible material. In some embodiments, the hemostasis layer 106 may be formed from a resorbable material. Suitable materials may include but are not limited to polygycolide (PGA), poly(lactic-co-glycolic acid) (PLGA), polylactic acid (PLLA), polycaprolcatone, collagen, a resorbable fabric, a hydrogel, any other suitable material or a combination thereof. In some embodiments, the hemostasis layer 106 can be formed into a stiff disk or pellet, or into a flexible fabric like layer. In some embodiments, the hemostasis layer 106 may conformed to an outer surface of the balloon 102 before deployment. In other embodiments, the hemostasis layer 106 may be separate from the balloon 102. In some embodiments, the hemostasis layer 106 may include a mesh that is coated or infused with hemostatic powder (e.g., chitin, kaolin, silica, polyethylene glycol, cyanoacrylate, gelatin, cellulose, etc.), hydrogel, collagen, resorbable glue, or other agent that facilitates vascular closure. As previously described, the outer surface of the balloon 102 may be coated with a non-stick coating to facilitate separation of the hemostasis layer 106 from the outer surface of the balloon 102.

Figure 4A:
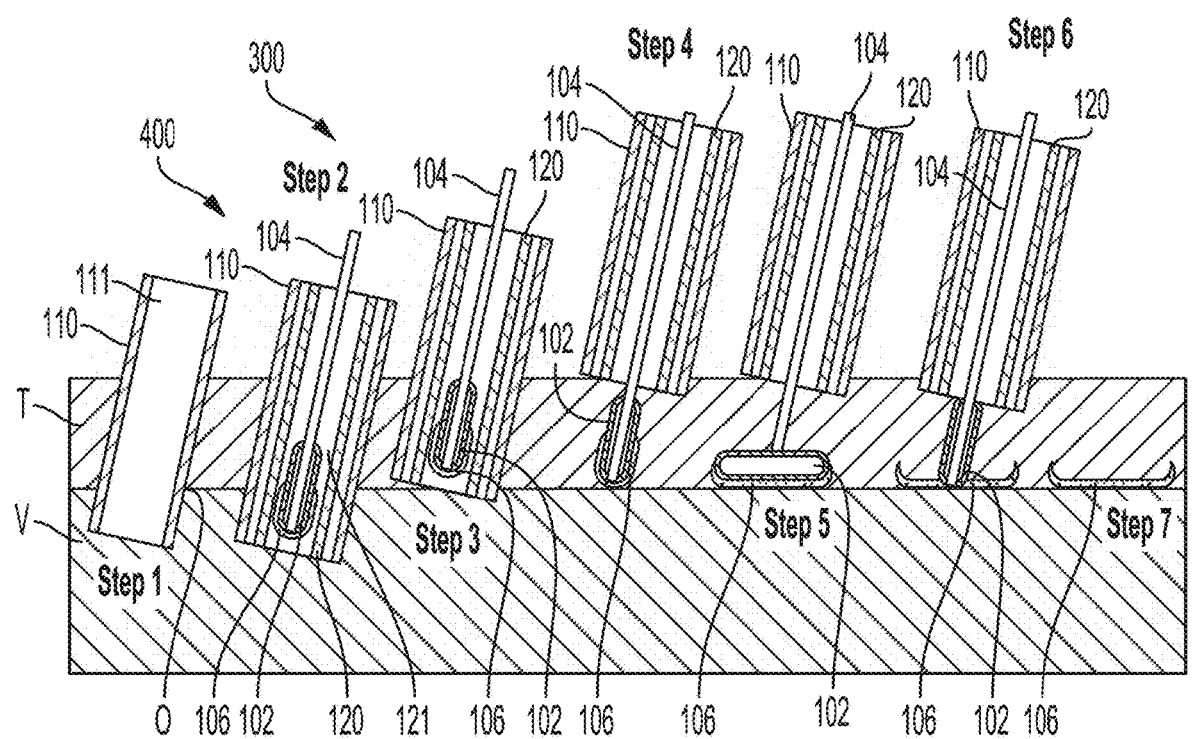
FIG. 4A illustrates a method for performing vascular hemostasis using a VCD that includes the portion shown in FIG. 3.

FIG. 4A illustrates an example method 400 for using the VCD 300 to achieve vascular hemostasis. The method 200 includes inserting the sheath 110 through the tissue track formed in the tissue such that a portion (e.g., a sheath distal end) of the sheath 110 is inserted through the opening O of the vessel V into the vessel V, at step 1. At step 2, the carrier tube 120 having the balloon 102 and the balloon tube 104 with the hemostasis layer 106 disposed thereon, each of which is disposed within the lumen 121 of the carrier tube 120 is inserted into the central channel 111 defined by the sheath 110 until a carrier tube distal end of the carrier tube 120 is located proximate to the sheath distal end. In some embodiments, the carrier tube 120 may not be used and the balloon 102 may be directly inserted through the central channel 111 of the sheath 110 via the balloon tube 104. In other embodiments, the sheath 110 may not be used and the carrier tube 120 may inserted directly through the tissue track. In still other embodiments, neither the carrier tube 120 nor the sheath 110 may be used and the balloon 102 may be inserted through the tissue track towards the opening O via the balloon tube 104.

At step 3, the sheath 110 along the with the carrier tube 120 is withdrawn from the tissue track along with the carrier tube 120 and the balloon 102 until the sheath distal end is disposed outside the vessel V proximate to the opening O. At step 4, the sheath 110 along with the carrier tube 120 is withdrawn out of the tissue track without withdrawing the balloon 102 such that the balloon 102 is disposed outside the central channel 111 and the lumen 121 proximate to the opening O. At step 5, the balloon 102 is inflated (e.g., via a fluid such as saline or air communicated into the balloon via the balloon tube 104) outside the vessel V above the opening such that the hemostasis layer 106 presses against an outer surface of the wall of the vessel V and closes the opening O. The balloon 102 is maintained in the inflated position for the time period (e.g., sufficient to cause the hemostasis layer 106 to adhere to the outer surface of the vessel V over the opening O.)

At step 6, the balloon 102 is deflated, for example, by withdrawing the fluid from the balloon 102 via the balloon tube 104. At step 7, the balloon 102 is removed from the tissue track, for example, by withdrawing the balloon tube 104 and, thereby the deflated balloon 102 away from the vessel V into the carrier tube 120 such that the hemostasis layer 106 separates from the outer surface of the balloon 102 and remains adhered to the outer surface of the wall of the vessel V. In some embodiments, a user may apply a light pressure on the skin of the subject on which vascular closure is being performed to dislodge the hemostasis layer from the balloon 102. In this manner, the hemostasis layer 106 continues the close the opening O even after the balloon 102 is removed. In embodiments in which the hemostasis layer 106 is formed from a resorbable material, the hemostasis layer 106 is resorbed into the tissue T after a natural resorption time of the resorbable material.

Figure 4B:
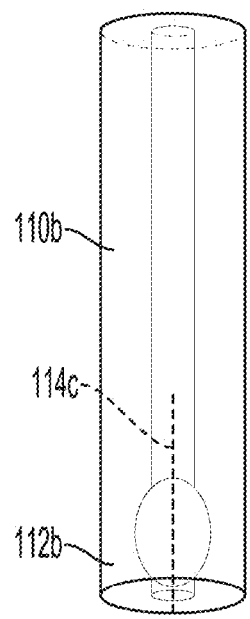
FIG. 4B is a side, elevation of a sheath having a plurality of perforations at a distal end thereof in a first configuration, according to an embodiment.
Figure 4C:
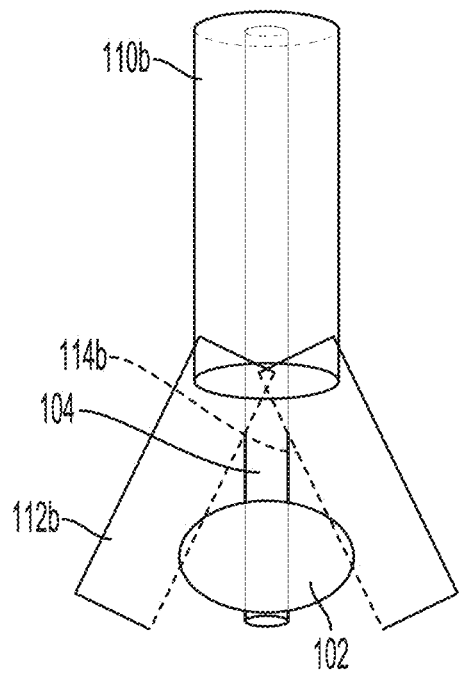
FIG. 4C shows the sheath in a second configuration in which the distal sheath is ripped open along the perforations due to inflation of the balloon within the distal end of the sheath.

FIG. 4B is a side, elevation of a sheath having a plurality of perforations at a distal end thereof in a first configuration, according to an embodiment; and FIG. 4B shows the sheath in a second configuration in which the distal sheath is ripped open along the perforations due to inflation of the balloon within the distal end of the sheath.

In some embodiments, the sheath distal end of the sheath 110 may be perforated or be flexible, such that the sheath distal end tears or flexes away when the balloon 102 is inflated. For example, FIG. 4A shows a side, elevation view of a sheath 110b that has a plurality of perforations 114b defined on a distal end 112b of the sheath 110b. When the first balloon 102 is inflated within the distal end, the distal end tears away when the balloon 102 is inflated. Alternative or additionally, the perforation can be on the carrier tube 120, or a carrier tube distal end may be perforated or flexible so as to tear or flex away when the balloon 102 is inflated. In various embodiments, the sheath may have a width (e.g., diameter) in a range of 0.2 mm to 10 mm, inclusive.

Figure 5A:
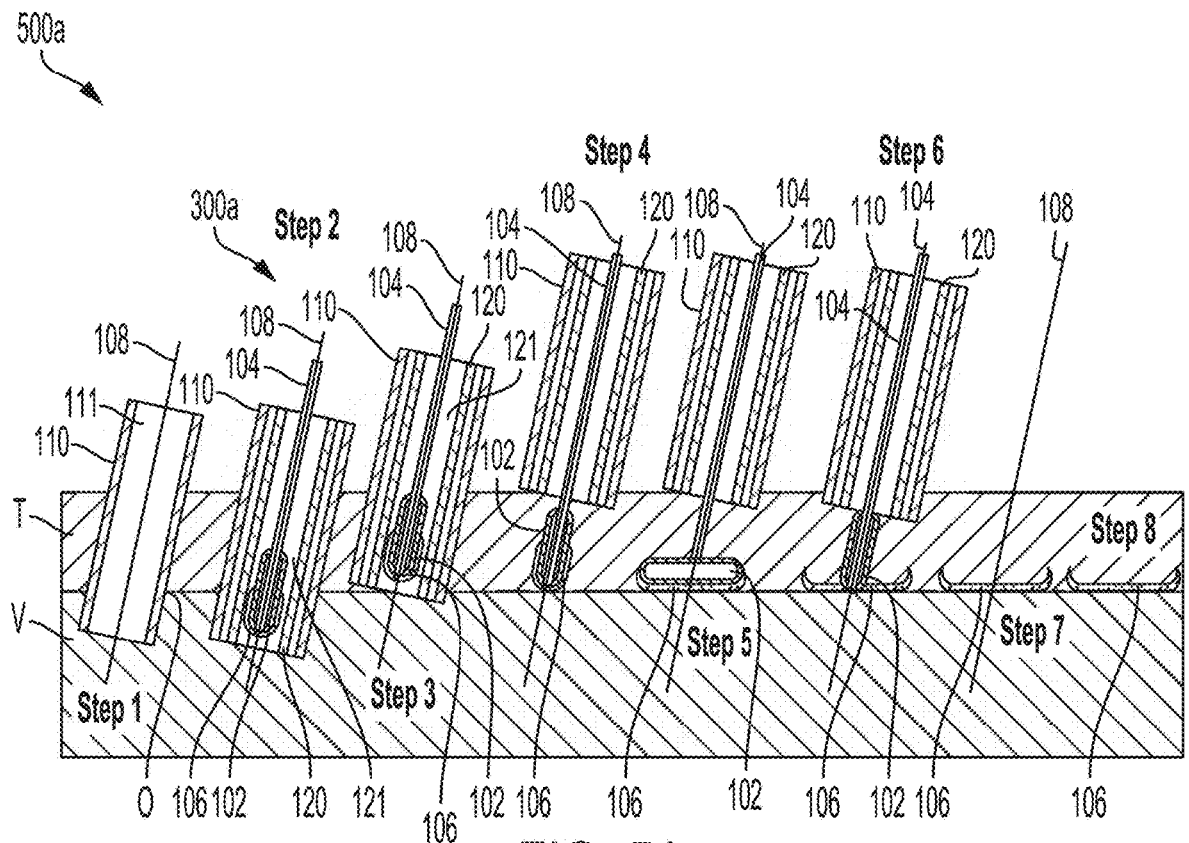
FIG. 5A illustrates a method for performing vascular hemostasis using a VCD that includes a sheath, a balloon tube, a balloon, a hemostasis layer, and a guide wire, according to an embodiment.

FIG. 5A illustrates an example method 500a for using the VCD 300a to achieve vascular hemostasis, according to an embodiment. The VCD 300a is substantially similar to the VCD 300 with the difference that the VCD 300a includes a guide wire 108a that may facilitate positioning of the balloon 102 over the opening O. The guide wire 108a may prevent the user from losing the vessel V, i.e., if the sheath 110b is withdrawn from the vessel V, or if no sheath 110b is used, the guide wire 108a maintains access to the vessel V and allows guiding of the balloon tube 104 towards the vessel V if the sheath 110b is removed from the tissue track TT or the sheath 110b is not used. In some embodiments, the guide wire 108 may extend through the balloon 102, for example, through a lumen defined through the balloon tube 104. In other embodiments, the guide wire 108 may extend adjacent to the balloon 102. For example, the carrier tube 120 may define another lumen adjacent to the lumen 121 through which the balloon tube 104 and the balloon 102 are disposed, and the guide wire 108 may be disposed through the other lumen. The guide wire 108 may be formed from any suitable material, for example, stainless steel, titanium, or a shape memory alloy (e.g., copper-aluminum-nickel, nickel-titanium, etc.). A distal end of the guide wire 108 may be removably disposed through the opening O within the vessel V before disposing the balloon 102 over the opening O so as to facilitate positioning of the balloon 102 over the opening O. The guide wire 108a may be maintained in the vessel V as long as medically necessary. In various embodiments, the guide wire 108 may have a cross-sectional width in a range of 0.2 mm to 0.5 mm, inclusive.

As shown in FIG. 5A, the method 500a includes inserting the sheath 110 through the tissue track formed in the tissue T such that a portion (e.g., a sheath distal end) of the sheath 110 is inserted through the opening O of the vessel V into the vessel V such that the guide wire 108 extends through the lumen 121 and distal end of the guide wire 108 is disposed through the opening O within the vessel V, at step 1. The guide wire 108a may be already in place in the tissue track TT with a distal end of the guide wire being within the vessel V through the opening O, and the sheath 110 disposed over the guide wire 108 into the tissue track TT with the guide wire 108 guiding the location of the sheath 110 relative to the tissue track TT. In some embodiments, the sheath 110 may include a locater or a dilator (not shown), for example, a tapered structure within the sheath 110, which facilitates guiding of the sheath 110 over the guide wire 108.

At step 2, the carrier tube 120 having the balloon 102 and the balloon tube 104 with the hemostasis layer 106 disposed thereon is inserted into the central channel 111 defined by the sheath 110 until a carrier tube distal end of the carrier tube 120 is located proximate to the sheath distal end. The balloon tube 104 may be inserted over the guide wire 108 (e.g., by sliding the guide wire 108 into a guide wire lumen defined in the balloon tube 104), or adjacent to the guide wire 108 (e.g., the carrier tube 120 may define a separate lumen for the guide wire 108 which is adjacent to the lumen 121.) Thus, the guide wire 108 may guide the displacement of the various components of the VCD 300a towards the opening O.

At step 3, the sheath 110 is withdrawn from the tissue track along with the carrier tube 120 and the balloon 102 until the sheath distal end is disposed outside the vessel V proximate to the opening O. At step 4, the sheath 110 along with the carrier tube 120 is withdrawn out of the tissue track without withdrawing the balloon 102 or the guide wire 108 such that the balloon 102 is disposed outside the central channel 111 and the lumen 121 proximate to the opening O.

At step 5, the balloon 102 is inflated (e.g., via a fluid such as saline or air communicated into the balloon via the balloon tube 104) outside the vessel V above the opening such that the hemostasis layer 106 presses against an outer surface of the wall of the vessel V and closes the opening O. The balloon 102 is maintained in the inflated position for the time period (e.g., sufficient to cause the hemostasis layer 106 to adhere to the outer surface of the vessel V over the opening O.)

At step 6, the balloon 102 is deflated, for example, by the withdrawing the fluid from the balloon 102 via the balloon tube 104. At step 7, the balloon 102 is removed from the tissue track while the guide wire 108 is maintained in its position. For example, the balloon tube 104 and, thereby the deflated balloon 102 is withdrawn away from the vessel V into the carrier tube 120 along or facilitated by the guide wire 108 such that the hemostasis layer 106 separates from the outer surface of the balloon 102 and remains adhered to the outer surface of the wall of the vessel V. At step 8, the guide wire 108 is removed leaving the hemostasis layer 106 disposed on the outer surface of the vessel V.

Figure 5B:
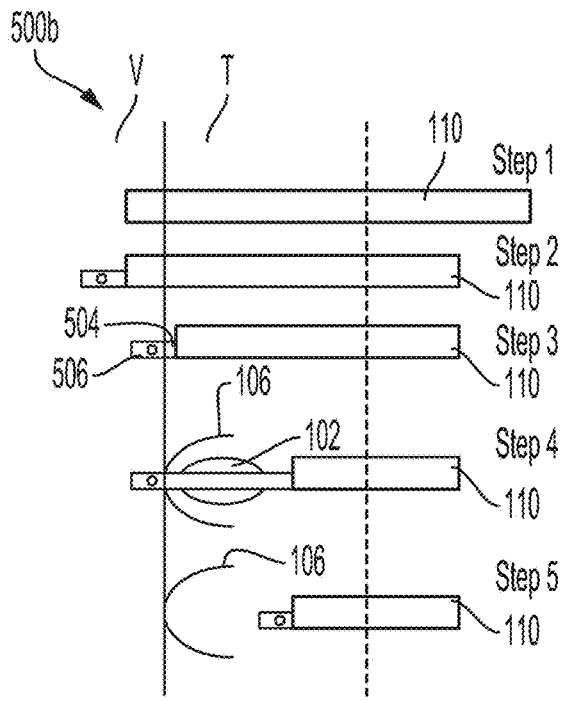
FIG. 5B illustrates a method for performing vascular hemostasis using a sheath, a balloon tube with a balloon and hemostasis layer, according to an embodiment.

FIG. 5B illustrates another method 500b for performing vascular hemostasis using the sheath 110, a balloon tube 504 with the balloon 102 and the hemostasis layer 106, according to an embodiment. The balloon tube 504 may serve as a locater and includes a flashback aperture 506 formed at a distal end thereof. The flashback aperture 506 allows for blood flashback into the balloon tube 504 which enables a user to determine a location of the distal end of the balloon tube 504.

The method 500b includes inserting the sheath 110 through the tissue track formed in the tissue such that a portion (e.g., a sheath distal end) of the sheath 110 is inserted through the opening of the vessel V into the vessel V at step 1. At step 2, the balloon tube 504 is inserted through the sheath 110 (e.g., via a dedicated channel defined through the sheath 110) until a distal end of the balloon tube 504 emerges from the sheath distal end and is located within the vessel V. Insertion of the balloon tube 504 may leave a gap in the sheath 110 to create one, two, or more flashback channels. In some embodiments, the sheath 110 is not used and the balloon tube 504 is inserted over a guide wire (e.g., the guide wire 108) into the vessel V.

At step 3, the sheath 110 is withdrawn from the tissue track along with the balloon tube 504 until the sheath distal end is disposed outside the vessel V proximate to the opening O but the distal end of the balloon tube 504 and, thereby the flashback aperture 506 remains within the vessel V. Flashback (i.e., flow of blood) may be observed through the balloon tube 504 due to blood flowing back through the flashback aperture 506, but not through the lumen defined in the sheath 110. The blood flashback through the flashback aperture 506 may serve to provide feedback to a user that the balloon 102 is at a desired distance from the outer surface of the vessel V.

At step 4, the sheath 110 is withdrawn out of the tissue track without withdrawing the balloon tube 504 such that the balloon 102 is disposed outside the sheath proximate to the opening O, and the balloon 102 is inflated to dispose the hemostasis layer 106 on the opening. At step 5, the balloon 102 is deflated, and the balloon tube 502 is withdrawn out of the vessel V and out of the tissue track along with the sheath 110 and the balloon 102 leaving the hemostasis layer 106 disposed on the outer surface of the vessel V.

Figure 5C:
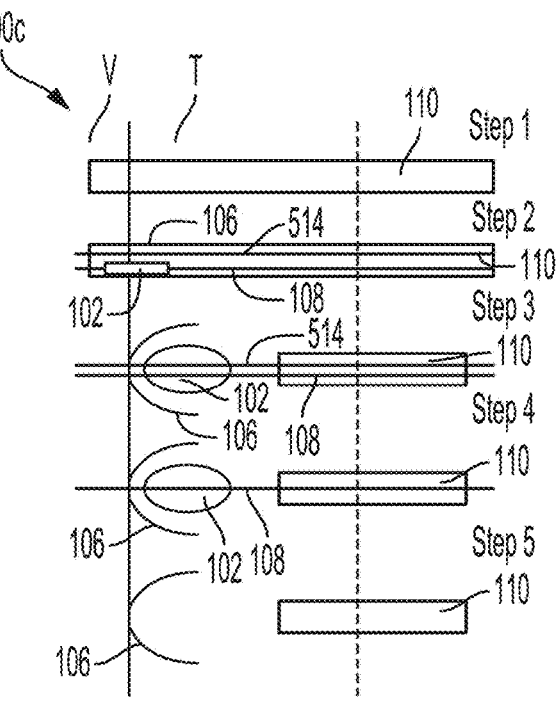
FIG. 5C illustrates a method for performing vascular hemostasis using a sheath, a balloon, a hemostasis layer, a guide wire, and a hemostasis layer wire, according to an embodiment.

In some embodiments, a separate hemostasis layer wire may be used to position a hemostasis layer on an outer surface of a vessel. For example, FIG. 5C illustrates a method 500c for performing vascular hemostasis using the sheath 110, the balloon 102 and the hemostasis layer 106, the guide wire 108, and a hemostasis layer wire 514, according to an embodiment.

The method 500c includes inserting the sheath 110 through the tissue track formed in the tissue such that a portion (e.g., a sheath distal end) of the sheath 110 is inserted through the opening of the vessel V into the vessel V at step 1. At step 2, the guide wire 108 along with the balloon 102, for example, via a balloon tube (not shown) with the hemostasis layer 106 disposed thereon, is inserted through the sheath 110. Simultaneously or subsequently, the hemostasis layer wire 514 is disposed through the sheath 110 such that a distal end of the hemostasis layer wire 514 is disposed through, or otherwise in contact with the hemostasis layer 106 into the vessel V. At step 3, the sheath 110 is withdrawn along with the guide wire 108, the balloon 103, and the hemostasis layer 106 until the balloon 102 is located proximate to an outer surface of the vessel V, the sheath 110 is withdrawn to expose the balloon 102, and the balloon 102 is inflated to dispose the hemostasis layer 106 on the outer surface of the vessel V facilitated by the hemostasis layer wire 514. At step 4, the hemostasis layer wire 514 is withdrawn out of the vessel V leaving the hemostasis layer 106 disposed on the vessel V (e.g., the hemostasis layer 106 slides off the hemostasis layer wire 514 as the hemostasis layer wire 514 is withdrawn.) At step 5, the balloon 102 is deflated and the balloon 102 along with the guide wire 108 is withdrawn from the tissue track.

Figure 6A:
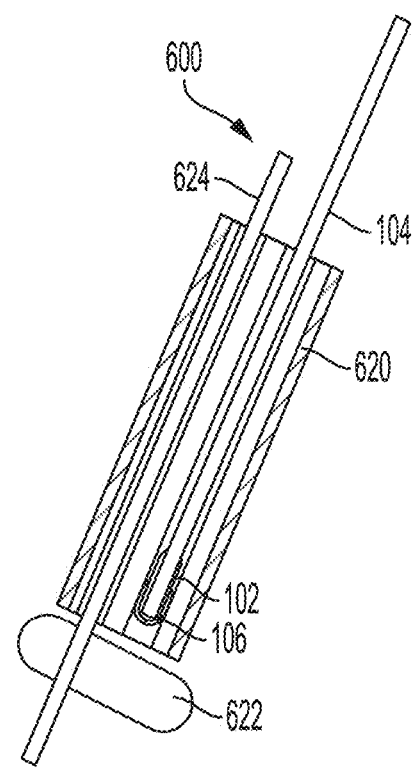
FIG. 6A is a side cross-section view of a VCD that includes a carrier tube, a first balloon tube with a first balloon and a hemostasis layer, and a second balloon tube with a second balloon, each disposed through the carrier tube, according to an embodiment.

In some embodiment, the balloon 102 is a first balloon 102, the balloon tube 104 is a first balloon tube 104, and the VCD may include a second balloon to facilitate positioning of the first balloon 102 over the vessel V, as well provide a back support for compressing the first balloon 102, and thereby the hemostasis layer 106 over the opening formed in the vessel. For example, FIG. 6A is a side cross-section view of a VCD 600 that includes a carrier tube 620, the first balloon tube 104 with the first balloon 102 and the hemostasis layer 106, and a second balloon tube 624 with a second balloon 622, each disposed through the carrier tube 620, according to an embodiment. The second balloon 622 is configured to be removably disposed through the opening within a vessel V such that when each of the first balloon 102 and the second balloon 622 are inflated, a wall of the vessel V and the hemostasis layer 106 are interposed between the first balloon 102 and the second balloon 622. This facilitates securing of the hemostasis layer 106 on the outer surface of the vessel V.

The second balloon 622 may have a similar width (e.g., diameter) relative the first balloon 102 when each of the first balloon 102 and the second balloon 622 are inflated, or may be larger or smaller than the first balloon 102. The second balloon tube 624 is fluidly coupled to the second balloon 622 and configured to selectively inflate or deflate the second balloon 622. The second balloon tube 624 may be made from the same materials as the first balloon tube 104. In some embodiments, the second balloon tube 624 may be stiffer than the first balloon tube 104 (e.g., has a larger wall thickness or is made from a stiffer material.)

Figure 6B:
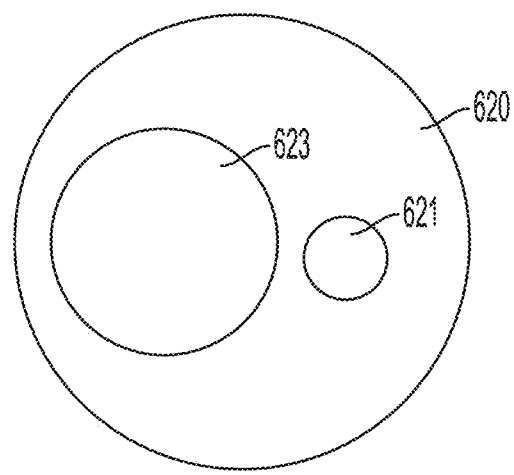
FIG. 6B is front view of the carrier tube of FIG. 6A.

As shown in FIG. 6A, the second balloon 622 and the second balloon tube 624 are axially offset from the first balloon 102 and the first balloon tube 104 (i.e., are non-concentric), and disposed in different lumens of the carrier tube 620. For example, FIG. 6B is front view of the carrier tube 620 of FIG. 6A. The carrier tube 620 defines a first lumen 621 through which the first balloon tube 104 and the first balloon 102 is inserted, and a second lumen 623 axially offset from the first lumen 621 through which the second balloon tube 624 and the second balloon 622 are inserted. The second lumen 623 may have a larger cross-section than the first lumen 621, for example, to accommodate a second guide wire 626 that in addition to the second balloon 622 is disposed through the second lumen 623, and/or the second balloon 622 that is larger than the first balloon 102. In other embodiments, the second lumen 623 may be smaller than the first lumen 621 even though the second balloon 622 may be larger than the first balloon 102. In some embodiments, the first balloon tube 104 and the second balloon tube 624 may have an inner diameter in a range of 0.2 mm to 1.0 mm, inclusive and an outer diameter in a range of 0.3 mm to 2.0 mm, inclusive, and the first balloon 102 and the second balloon 622 may have a diameter after inflation in a range of 2 mm to 20 mm, inclusive. In some embodiments, the VCD 600 may also include the second guide wire 626 extending through or adjacent to the second balloon 622 (FIG. 7), for example, to facilitate positioning of the second balloon 622 within the vessel.

Figure 7:
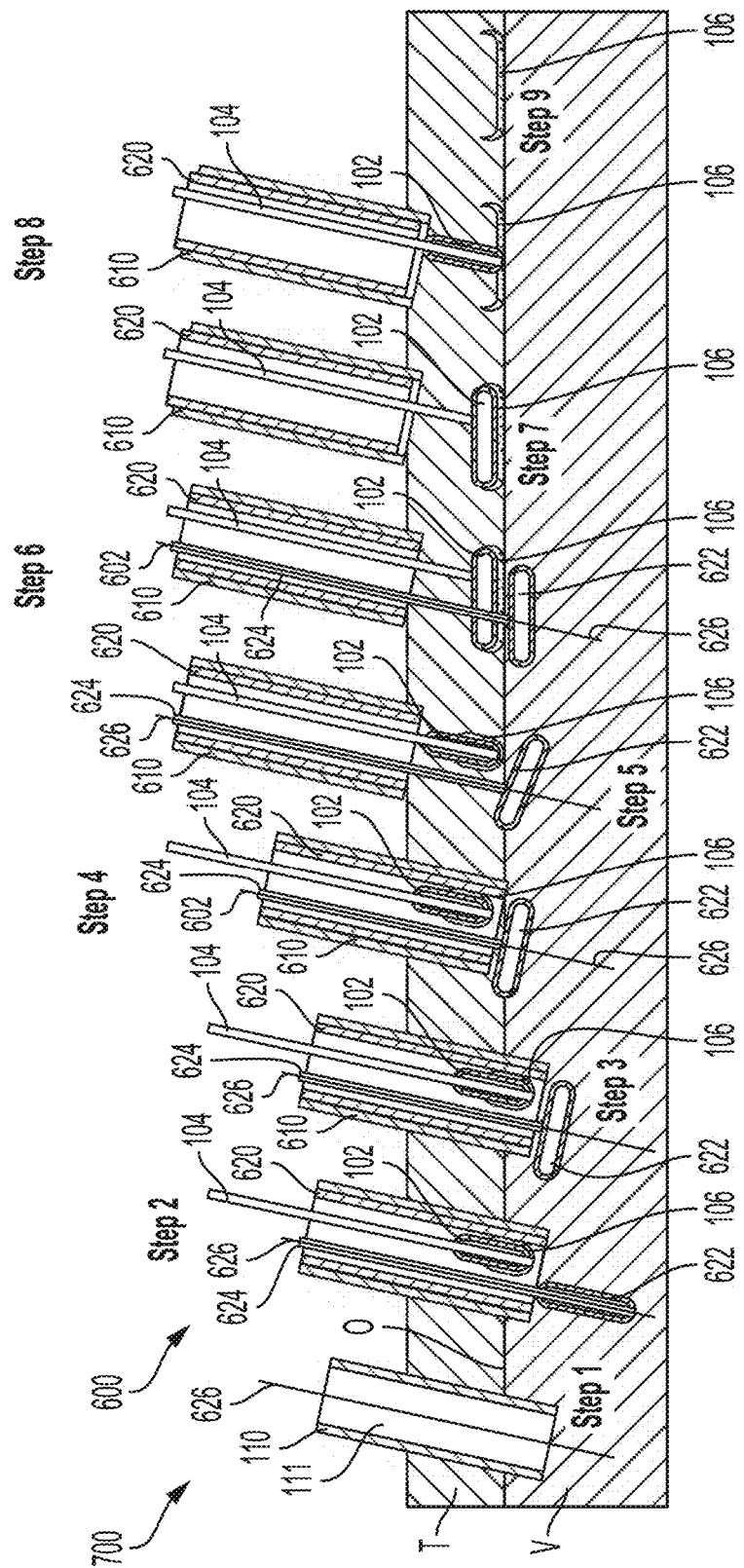
FIG. 7 illustrates a method for performing vascular hemostasis using a VCD that includes a sheath, first balloon tube, a first balloon, a hemostasis layer, a second balloon tube, a second balloon axially offset from the first balloon, and a second guide wire, according to an embodiment.

The first balloon 102 and the second balloon 622 are independently movable through their respective lumens 621 and 623 of the carrier tube 620. For example, FIG. 7 illustrates an example method 700 for using the VCD 600 to achieve vascular hemostasis. The method 700 includes inserting the sheath 110 along with the second guide wire 626 through the tissue track formed in the tissue T such that a portion (e.g., a sheath distal end) of the sheath 110 as well as distal end of the second guide wire 626 is inserted through the opening O of the vessel V into the vessel V, at step 1. In some embodiments, the second guide wire 626 may be removed after the sheath 110 is disposed through the tissue track TT. In other embodiments, the second guide wire 626 or a first balloon guide wire may be not be used.

At step 2, the carrier tube 620 having the first balloon 102 and the first balloon tube 104 with the hemostasis layer 106 disposed thereon, each of which is disposed within the lumen 621 of the carrier tube 120 is inserted into the central channel 111 defined by the sheath 110 until a carrier tube distal end of the carrier tube 120 is located proximate to the sheath distal end. The insertion of the carrier tube 620 also causes the second balloon tube 624 along with the second balloon 622 to be located proximate to the sheath distal end within the second lumen 623 of the carrier tube 620. The second balloon tube 624 may be advanced through the second lumen 623 facilitated by the second guide wire 626 until the second balloon 622 is disposed within the vessel V. In other embodiments, the carrier tube 620 is inserted into the central channel 111 before inserted the first balloon 102 and the second balloon 622 into their respective lumens 621 and 623.

At step 3, the second balloon 622 is inflated. At step 4, the sheath 110 along with the carrier tube 620, the first balloon 102, and the second balloon 622 is withdrawn from the tissue track until the second balloon 622 contacts an inner surface of a wall of the vessel V. This may alert user that the sheath distal end is disposed outside the vessel V proximate to the opening O. The user may continue to apply tension on the second balloon 622 towards the vessel V so as to ensure that the second balloon 622 remains in contact with an inner surface of a wall of the vessel V until at least the first balloon 102 is inflated.

At step 5, the sheath 110 along with the carrier tube 620 is withdrawn away from the vessel V without withdrawing the first balloon 102 such that the first balloon 102 is disposed outside the central channel 111 and the lumen 121 proximate to the opening O. In some embodiments, the sheath 110 and/or the carrier tube 620 may be withdrawn out of the tissue track TT. At step 6, the first balloon 102 is inflated (e.g., via a fluid such as saline or air communicated into the balloon via the balloon tube 104) outside the vessel V above the opening such that the hemostasis layer 106 presses against an outer surface of the wall of the vessel V and closes the opening O. Inflating the first balloon 102 also causes the hemostasis layer 106 and the wall of the vessel V to be interposed between the first balloon 102 and the second balloon 622. The first balloon 102 is maintained in the inflated position for the time period (e.g., sufficient to cause the hemostasis layer 106 to adhere to the outer surface of the vessel V over the opening O.)

At step 7, the second balloon 622 is deflated and withdrawn from vessel V while the first balloon 102 is still inflated and applying pressure on the hemostasis layer 106. At step 8, the first balloon 102 is deflated, for example, by the withdrawing the fluid from the balloon 102 via the balloon tube 104. At step 9, the balloon 102 is removed from the tissue track, for example, by withdrawing the balloon tube 104 and, thereby the deflated balloon 102 away from the vessel V into the carrier tube 120 such that the hemostasis layer 106 separates from the outer surface of the balloon 102 and remains adhered to the outer surface of the wall of the vessel V.

Figure 8:
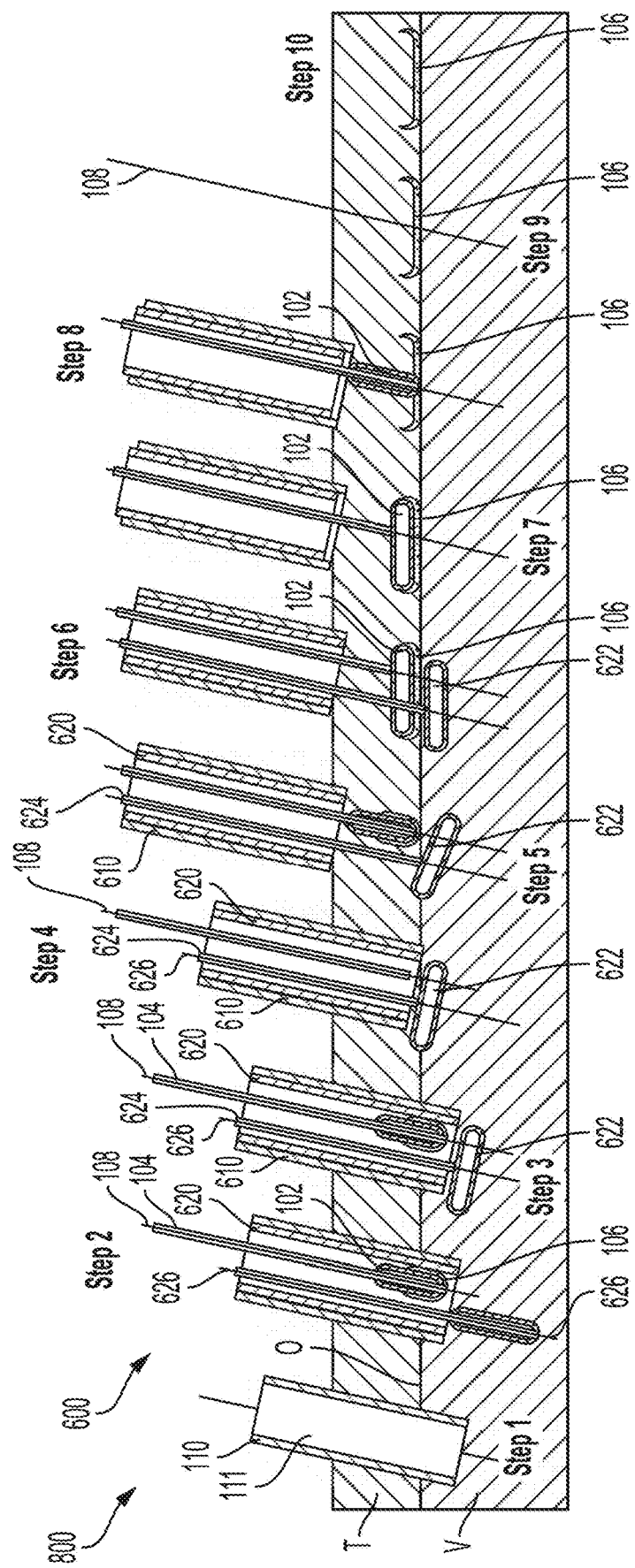
FIG. 8 illustrates a method for performing vascular hemostasis using a VCD that includes a sheath, a carrier tube, first balloon tube, a first balloon, a first guide wire, a hemostasis layer, a second balloon tube, a second balloon axially offset from the first balloon, and a second guide wire, according to an embodiment.

In some embodiments, the VCD 600 may also include the first guide wire 108 to facilitate positioning of the first balloon 102 over the vessel V. For example, FIG. 8 illustrates an example method 800 for using the VCD 600 to achieve vascular hemostasis. The method 800 includes inserting the sheath 110 along with the second guide wire 626 through the tissue track formed in the tissue such that a portion (e.g., a sheath distal end) of the sheath 110 as well as distal end of the second guide wire 626 is inserted through the opening O of the vessel V into the vessel V, at step 1.

At step 2, the carrier tube 620 having the first balloon 102 and the first balloon tube 104 with the hemostasis layer 106 disposed thereon, each of which is disposed within the lumen 621 of the carrier tube 120 is inserted into the central channel 111 defined by the sheath 110 until a carrier tube distal end of the carrier tube 120 is located proximate to the sheath distal end and a distal end of the first guide wire 1 extends into the vessel V. The insertion of the carrier tube 620 also causes the second balloon tube 624 along with the second balloon 622 to be located proximate to the sheath distal end within the second lumen 623 of the carrier tube 620. The second balloon tube 624 may be advanced through the second lumen 623 facilitated by the second guide wire 626 until the second balloon 622 is disposed within the vessel V.

Steps 3 to 8 are substantially the same as steps 3 to 8 of the method 700, with the only difference that positioning of the first balloon 102 over the vessel V is facilitated by the first guide wire 108. At step 9, the first balloon 102 is removed from the tissue track, without removing the first guide wire. In other embodiments, first guide wire 108 is removed before the first balloon 102 is removed from the tissue track TT. At step 10, the first guide wire 108 is removed from the tissue track leaving the hemostasis layer 106 disposed on the outer surface of the vessel V.

Figure 9:
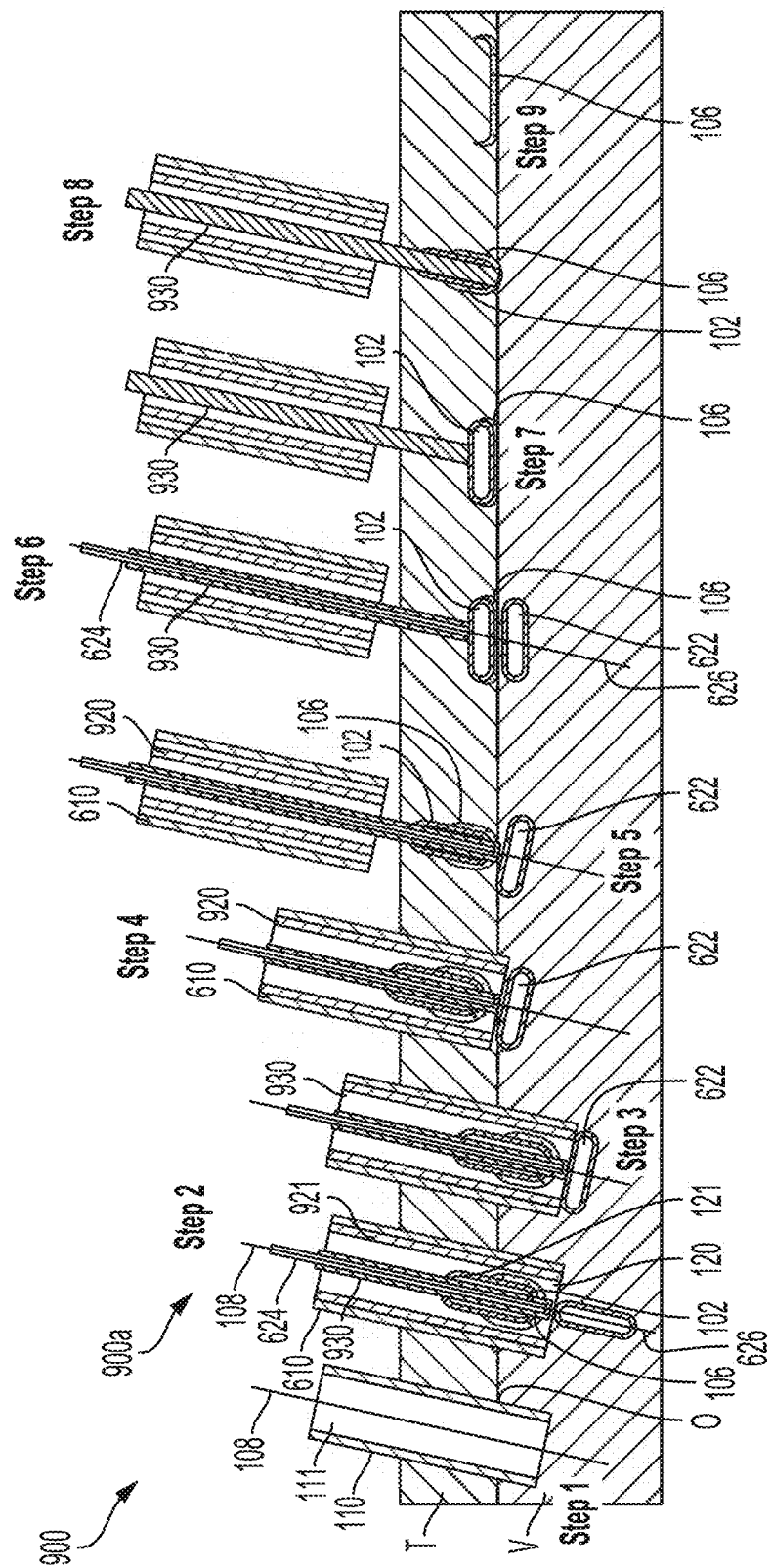
FIG. 9 illustrates a method for performing vascular hemostasis using a VCD that includes a sheath, a carrier tube, first balloon tube, a first balloon, a hemostasis layer, a second balloon tube, a second balloon axially aligned with the first balloon, and a guide wire, according to an embodiment.

In some embodiment, a first balloon and a second balloon may be axially aligned with each other and configured to move independently of each other. For example, FIG. 9 illustrates an example method 900 for using a VCD 900a to achieve vascular hemostasis. The VCD 900a includes the sheath 110, a first balloon tube 930, the first balloon 102 fluidly coupled to the first balloon tube 930 and having the hemostasis layer 106 disposed on at least a portion of an outer surface thereof, the first guide wire 108, the second balloon 622 coupled to the second balloon tube 624, and a carrier tube 620.

Different from the VCD 600, the second balloon 622 is axially aligned with the first balloon 102. For example, the first balloon tube 930 may define a lumen through which the second balloon tube 624 is disposed such that the first balloon tube 930 and the second balloon tube 624 are co-axial with each other. The first balloon tube 930 and the second balloon tube 624 may be independently movable relative to each other, for example, in a telescopic arrangement. The first balloon 102 may be disposed around an outer periphery of the first balloon tube 930, for example, may have a doughnut shape and the first balloon tube 930 may define a port on a sidewall thereof through which a fluid is communicated into the first balloon 102 to inflate the first balloon 102.

In some embodiments, the carrier tube 920 defines a single lumen 921 through which the first balloon tube 930 is slidably disposed, with the second balloon tube 624 disposed through the first balloon tube 930. The first guide wire 108 may be disposed through a lumen of the second balloon tube 624 such that the first guide wire 108 is co-axial with each of the first balloon tube 930 and the second balloon tube 624. In other embodiments, the first guide wire 108 may be axially offset from the first and second balloon tubes 930 and 624 (e.g., disposed through the same lumen adjacent to the first and second balloon tubes 930 and 624, or a separate lumen defined in the carrier tube 920 parallel to the lumen 921 of the carrier tube 920.)

The method 900 includes inserting the sheath 110 along with the first guide wire 108 through the tissue track formed in the tissue such that a portion (e.g., a sheath distal end) of the sheath 110 as well as distal end of the first guide wire 108 is inserted through the opening O of the vessel V into the vessel V, at step 1.

At step 2, the carrier tube 920 having the first balloon tube 930 and the first balloon 102 with the hemostasis layer 106 disposed thereon, each of which is disposed within a lumen 921 of the carrier tube 920 is inserted into the central channel 111 defined by the sheath 110 until a carrier tube distal end of the carrier tube 920 is located proximate to the sheath distal end. The insertion of the carrier tube 620 also causes the second balloon tube 624 along with the second balloon 622 to be located proximate to the sheath distal end within the lumen 623 defined by the first balloon tube 930. The second balloon tube 624 may be advanced through the second lumen 623 facilitated by the first guide wire 108 until the second balloon 622 is disposed within the vessel V. In other embodiments, the carrier tube 920 is inserted into the central channel 111 before inserted the first balloon 102 and the second balloon 622 into the lumen 921.

At step 3, the second balloon 622 is inflated. At step 4, the sheath 110 along with the with the carrier tube 920, the first balloon 102, and the second balloon 622 is withdrawn from the tissue track until the second balloon 622 contacts an inner surface of a wall of the vessel V. At step 5, the sheath 110 along with the carrier tube 620 is withdrawn out of the tissue track without withdrawing the first balloon 102 such that the first balloon 102 is disposed outside the central channel 111 and the lumen 921 proximate to the opening O.

At step 6, the first balloon 102 is inflated (e.g., via a fluid such as saline or air communicated into the first balloon 102 via the first balloon tube 930) outside the vessel V above the opening O such that the hemostasis layer 106 presses against an outer surface of the wall of the vessel V and closes the opening O. Inflating the first balloon 102 also causes the hemostasis layer 106 and the wall of the vessel V to be interposed between the first balloon 102 and the second balloon 622 such that the hemostasis layer 106 is tamped therebetween. The first balloon 102 is maintained in the inflated position for the time period (e.g., sufficient to cause the hemostasis layer 106 to adhere to the outer surface of the vessel V over the opening O.)

At step 7, the second balloon 622 is deflated and withdrawn from vessel V and in some embodiments, also the carrier tube 620 via the second balloon tube 624 through the first balloon tube 930. In some embodiments, the first guide wire 108 may also be withdrawn from the tissue track at step 7. At step 8, the first balloon 102 is deflated, for example, by the withdrawing the fluid from the first balloon 102 via the first balloon tube 930. At step 9, the first balloon 102 is removed from the tissue track TT, for example, by withdrawing the balloon tube 930 and, thereby the deflated balloon 102 away from the vessel V into the carrier tube 120, or alternatively, withdrawing the carrier tube 120 and the balloon tube 930 simultaneously from the tissue track TT, such that the hemostasis layer 106 separates from the outer surface of the balloon 102 and remains adhered to the outer surface of the wall of the vessel V.

Figure 10:
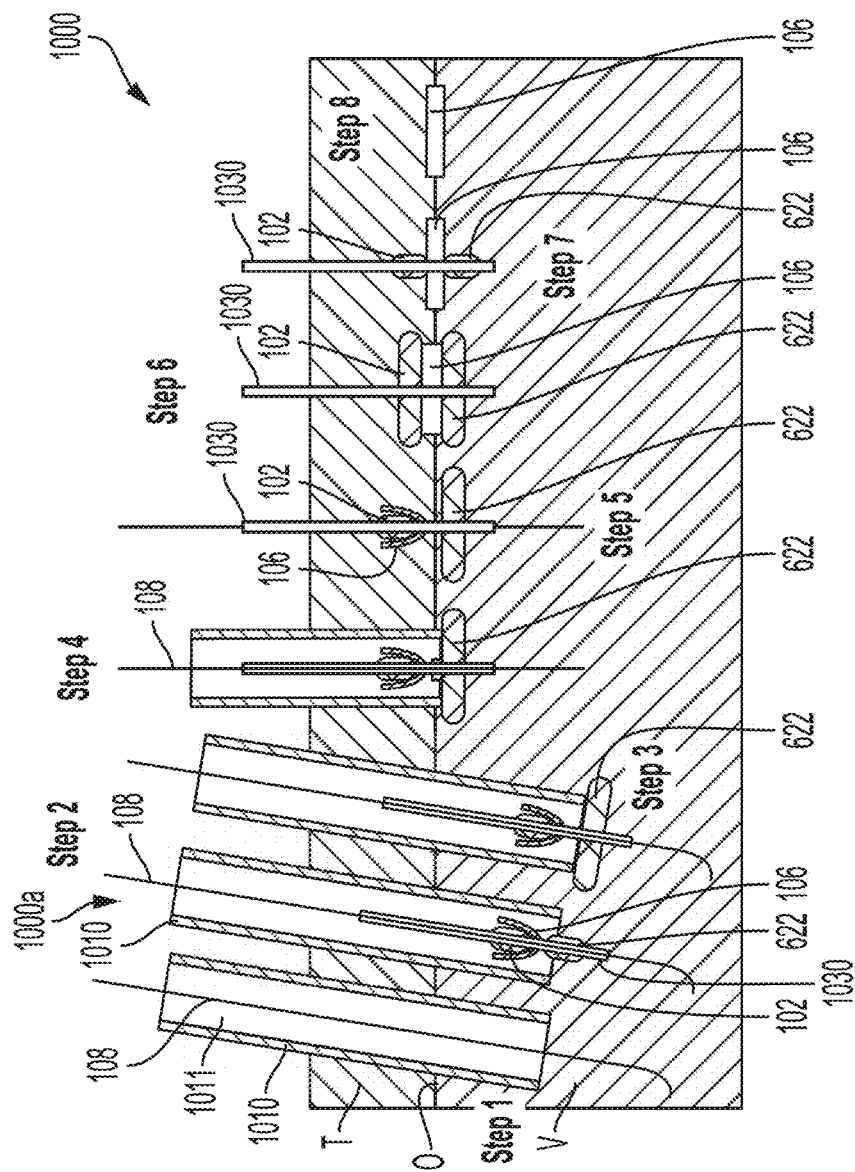
FIG. 10 illustrates a method for performing vascular hemostasis using a VCD that includes a sheath, balloon tube, a first balloon, a hemostasis layer, a second balloon axially aligned with the first balloon, and a guide wire, according to an embodiment.

In some embodiments, a first balloon and a second balloon may be axially aligned with each other and may be positioned at a fixed distance from each other. For example, FIG. 10 illustrates an example method 1000 for using a VCD 1000a to achieve vascular hemostasis. The VCD 1000a includes a sheath 1010 defining a central channel 1011, a balloon tube 1030, the first balloon 102 fluidly coupled to the balloon tube 1030 and having the hemostasis layer 106 disposed on at least a portion of an outer surface thereof, the first guide wire 108, and the second balloon 622 also coupled to the balloon tube 1030.

The second balloon 622 is disposed on the balloon tube 1030 more proximate to a distal end of the balloon tube 1030 than the first balloon 102 such that when the distal end of the tube 1030 is inserted through the opening O defined in the vessel V, the second balloon 622 enters the vessel V first before the first balloon 102. The balloon tube 1030 may be structured to independently inflate or deflate the first and second balloons 102 and 622, for example, define separate lumens to selectively and independently communicate inflating fluid to each of the first and second balloons 102 and 622. The first and second balloons 102 and 622 are, therefore axially aligned and axially spaced by a predetermined distance. The spacing distance may be selected such that when each of the first and second balloons 102 and 622 are inflated, the hemostasis layer 106 is tamped or squeezed between the first and second balloons 102 and 622. While not shown, in some embodiments, the VCD 1000a may also include a carrier tube (e.g., the carrier tube 920).

The method 1000 includes inserting the sheath 1110 along with the first guide wire 108 through the tissue track formed in the tissue T such that a portion (e.g., a sheath distal end) of the sheath 1010 as well as distal end of the first guide wire 108 is inserted through the opening O of the vessel V into the vessel V, at step 1.

At step 2, the balloon tube 1030 with the first balloon 102 having the hemostasis layer 106 disposed thereon, and the second balloon 622 is inserted through the central channel 1011 of the sheath 1010 until the second balloon 622 extends beyond the sheath distal end into the vessel V. The displacement of the balloon tube 1030 may be facilitated or guided by the first guide wire 108.

At step 3, the second balloon 622 is inflated. At step 4, the sheath 1010 along with the balloon tube 1030 is withdrawn from the tissue track until the second balloon 622 contacts an inner surface of a wall of the vessel V. At step 5, the sheath 1010 is withdrawn out of the tissue track without withdrawing the balloon tube 1030 such that the first balloon 102 is disposed outside the central channel 1011 proximate to the opening O.

At step 6, the first balloon 102 is inflated (e.g., via a fluid such as saline or air communicated into the first balloon 102 via the first balloon tube 930) outside the vessel V above the opening O such that the hemostasis layer 106 presses against an outer surface of the wall of the vessel V and closes the opening O. Moreover, is interposed between the first balloon 102 and the second balloon 622. The first and second balloons 102 are maintained in the inflated position for the time period (e.g., sufficient to cause the hemostasis layer 106 to adhere to the outer surface of the vessel V over the opening O.) The first guide wire 108 may be withdrawn from the tissue track at step 6 as shown in FIG. 10. In other embodiments, the first guide wire 108 may be withdrawn from the tissue track simultaneously with the balloon tube 1030 or after the balloon tube 1030 is withdrawn from the tissue track.

At step 7, each of the first and second balloons 102 and 622 are deflated (e.g., simultaneously, or the first balloon 102 is deflated before or after the second balloon 622 is deflated.) At step 8, the balloon tube 1030 is withdrawn out of the tissue track leaving the hemostasis layer 206 disposed on the outer surface of the vessel V.

Figure 11:
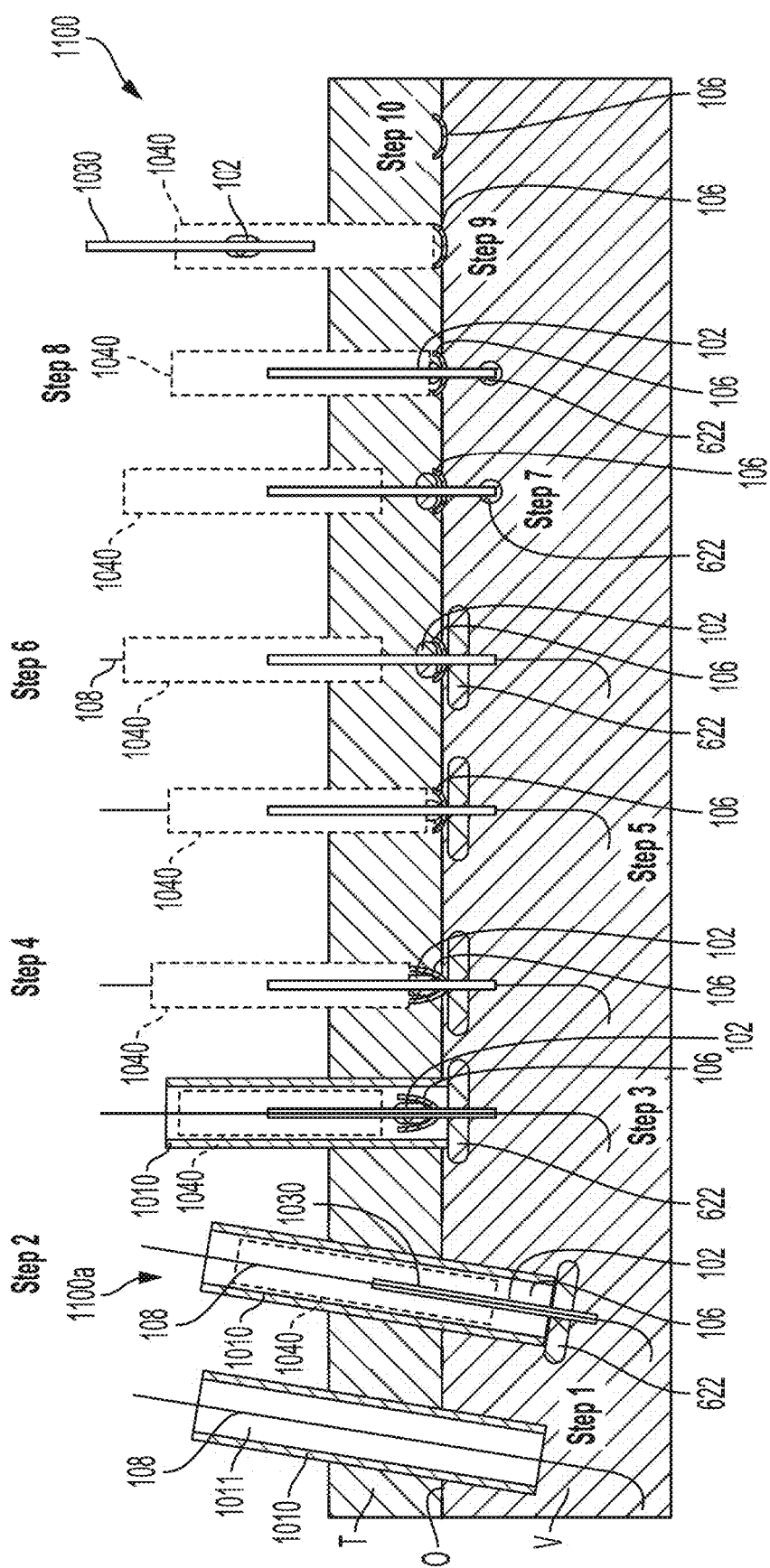
FIG. 11 illustrates a method for performing vascular hemostasis using a VCD that includes a sheath, a balloon tube, a first balloon, a hemostasis layer, a second balloon axially aligned with the first balloon, a guide wire, and a tamper tube, according to an embodiment.

In some embodiments, a VCD may include a tamper tube for facilitating positioning of the hemostasis layer 106 on the outer surface of a vessel. For example, FIG. 11 illustrates a method 1100 for performing vascular hemostasis using a VCD 1100a. The VCD 1100a is similar to the VCD 1000a and includes the sheath 1010, the balloon tube 1030, the first balloon 102, the hemostasis layer 106, the second balloon 622 axially aligned with the first balloon 102, and the first guide wire 108. However, different from the VCD 1000a, the VCD 1100a also includes a tamper tube 1040 configured to squeeze or tamp the hemostasis layer 106 on the outer surface of the vessel V to maintain the hemostasis layer 106 on the outer surface of the vessel V once the balloon tube 1030 has been withdrawn from the tissue track.

The method 1100 includes inserting the sheath 1110 along with the first guide wire 108 through the tissue track formed in the tissue T such that a portion (e.g., a sheath distal end) of the sheath 1010 as well as distal end of the first guide wire 108 is inserted through the opening O of the vessel V into the vessel V, at step 1.

At step 2, the balloon tube 1030 with the first balloon 102 having the hemostasis layer 106 disposed thereon, and the second balloon 622 is inserted through the central channel 1011 of the sheath 1010 until the second balloon 622 extends beyond the sheath distal end into the vessel V. Moreover, the tamper tube 1040 is also inserted through the central channel 1011 such that the first balloon 102 extends beyond a distal end of the tamper tube 1040, and the second balloon 622 is inflated. The tamper tube 1040 serves to apply tamper, i.e., press the first balloon 102 and/or the hemostasis layer 106 onto the wall of the vessel V so as to facilitate hemostasis and/or removal of the hemostasis layer 106 from the external surface of the first balloon 102 when the first balloon 102 is withdrawn from the tissue track TT. The displacement of the balloon tube 1030 may be facilitated or guided by the first guide wire 108.

At step 3, the sheath 1010 along with the balloon tube 1030 and the tamper tube 1040 is withdrawn from the tissue track until the second balloon 622 contacts an inner surface of a wall of the vessel V. At step 4, the sheath 1010 is withdrawn out of the tissue track without withdrawing the balloon tube 1030 or the tamper tube 1040.

At step 5, the tamper tube 1040 is axially displaced in the tissue track towards the vessel V over the first balloon 102 that is still in its deflated position. This causes a distal end of the tamper tube 1040 to contact the hemostasis layer 106 and unfold the hemostasis layer 106 so that the layer is disposed over the opening O and closes the opening O. At step 6, the tamper tube 1040 is displaced away from the vessel V and the first balloon 102 is inflated such that the hemostasis layer 106 and the wall of the vessel V are interposed between the first and second balloons 102 and 622. The first and second balloons 102 and 622 may be maintained in their inflated positions for the time period sufficient to achieve hemostasis, as previously described.

At step 7, the second balloon 622 is deflated. The first guide wire 108 may be withdrawn from the tissue track at step 7 as shown in FIG. 11. In other embodiments, the first guide wire 108 may be withdrawn from the tissue track simultaneously with the balloon tube 1030 or after the balloon tube 1030 is withdrawn from the tissue track.

At step 8, the first balloon 102 is deflated and the tamper tube 1040 is again moved towards the vessel V until the distal end of the tamper tube 1040 contacts the hemostasis layer 106. At step 9, the balloon tube 1030 is withdrawn from the tissue track without moving the tamper tube 1040 such that the distal end to the tamper tube 1040 remains in contact with the hemostasis layer 106 and causes the hemostasis layer 106 to separate from the first balloon 102. This inhibits the hemostasis layer 106 from being dislodged from the outer surface of the vessel V as the balloon tube 1030 is withdrawn from the tissue track. At step 10, the tamper tube 1040 is removed from the tissue track.

Figure 12:
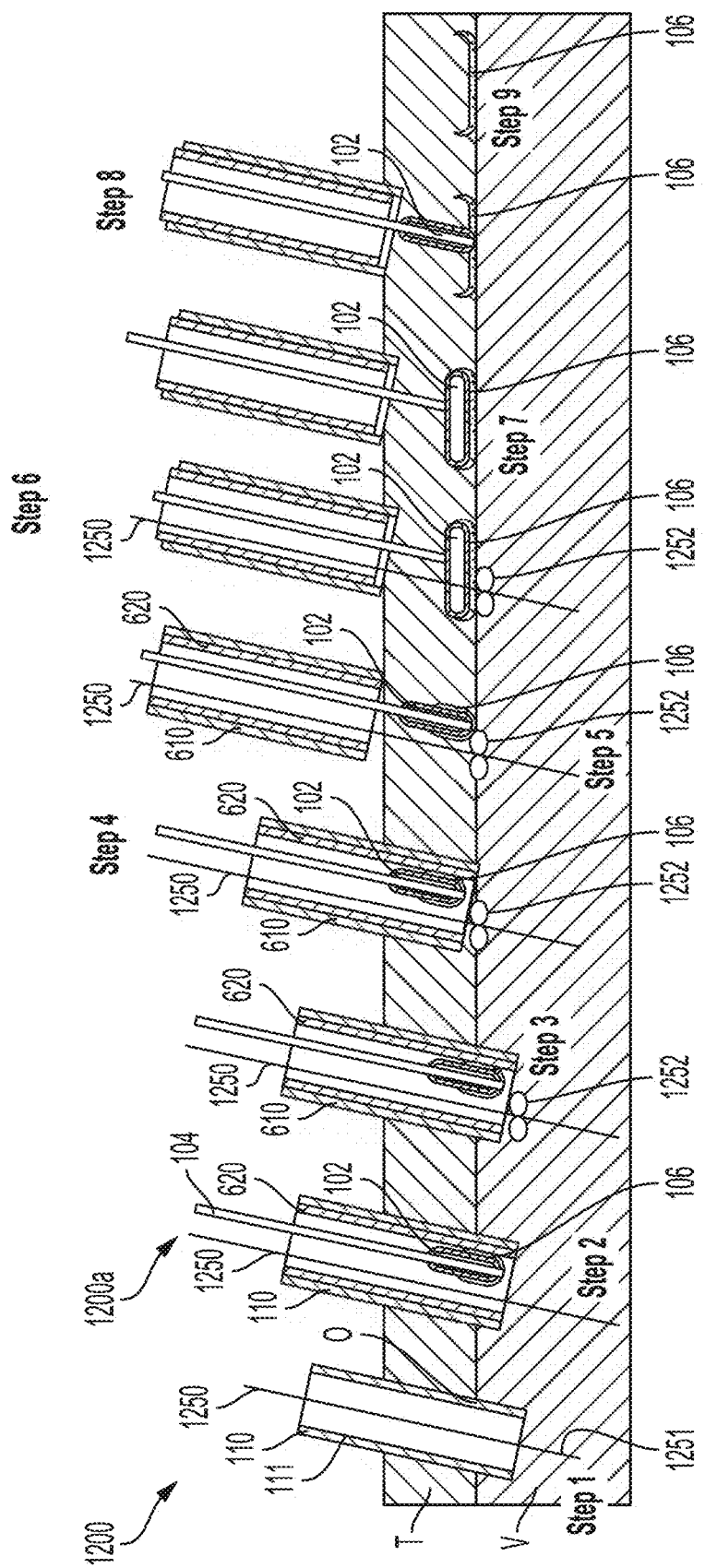
FIG. 12 illustrates a method for performing vascular hemostasis using a VCD that includes a sheath, a carrier tube, a balloon tube, a balloon, a hemostasis layer, and an anchor wire axially offset from the balloon, according to an embodiment.

In some embodiments, a VCD may include an anchor so as to provide a back support for squeezing or tamping the hemostasis layer 106 on the outer surface of the vessel V. FIG. 12 illustrates a method 1200 for performing vascular hemostasis using a VCD 1200a that includes the sheath 110, the carrier tube 620, the first balloon tube 104, the first balloon 102, the hemostasis layer 106, and an anchor wire 1250, according to an embodiment.

The anchor wire 1250 includes an anchor wire distal end 1251 configured to be disposed through the opening O into the vessel V. The anchor wire distal end 1251 is selectively movable between a contracted configuration when the anchor wire distal end 1251 is disposed outside the vessel V, and an expanded configuration when the anchor wire distal end 1251 is disposed within the vessel V. In the expanded configuration, the anchor wire distal end 1251 forms an anchor 1252 such that a wall of the vessel V and the hemostasis layer 106 are interposed between the first balloon 102 and the anchor 1252 when the first balloon 102 is inflated to facilitate securing of the hemostasis layer 106 on the outer surface of the vessel V. The anchor wire 1250 is axially offset from the first balloon 102. In some embodiments, the first balloon 102 and the first balloon tube 104 are disposed through the first lumen 621 of the carrier tube 620 and the anchor wire 1250 is disposed through the second lumen 623 of the carrier tube 620 or any other carrier tube. The anchor wire 1250 and the first balloon tube 104 are independently movable through their respective lumens 621 and 623 of the carrier tube 620. In other embodiments, the carrier tube 620 may define a single lumen and the first balloon tube 104 and anchor wire 1250 may be disposed through the same lumen while being axially offset from each other.

In some embodiments, the anchor wire 1250 may be formed from a shape memory alloy (e.g., copper-aluminum-nickel, nickel-titanium, etc.). The anchor wire distal end 1251 may be pre-shaped into a desirable shape (e.g., a FIG. 8 shape) to form the anchor 1252. The anchor wire 1250 may be configured such that the anchor wire distal end 1251 contracts and straightens while being inserted through its respective lumen (e.g., the lumen 623) through the carrier tube 620, and expands to form the anchor 1252 on emergence from the carrier tube 620. In other embodiments, the anchor 1252 may include a flexible cage, a flexible disk or any other flexible structure couple to the anchor wire distal end 1251. In such embodiments, the anchor 1252 may be configured to flex into a contracted or collapsed position when disposed within the lumen 623 of the carrier tube 620, and expands on exiting the carrier tube 620. The anchor 1252 moves back into the contracted or collapsed position as the anchor 1252 is moved back into the carrier tube 620. In some embodiments, the anchor wire 1250 is formed of a shape memory alloy. In such embodiments, the anchor wire 1250 is in a relaxed state in the expanded configuration when no force is applied on the anchor wire distal end by the walls of the lumen (e.g., the lumen 623).

The method 1200 includes inserting the sheath 110 along with the anchor wire 1250 through the tissue track formed in the tissue T such that a portion (e.g., a sheath distal end) of the sheath 110 as well as an anchor wire distal end 1251 of the anchor wire 1250 is inserted through the opening O of into the vessel V, at step 1. The anchor wire distal end 1251 may be inserted a predetermined distance such that a portion of the anchor wire distal end 1251 that forms the anchor 1252 is still within the sheath 110.

At step 2, the carrier tube 620 having the first balloon 102 and the first balloon tube 104 with the hemostasis layer 106 disposed thereon, each of which is disposed within the lumen 621 of the carrier tube 620 is inserted into the central channel 111 defined by the sheath 110 until a carrier tube distal end of the carrier tube 120 is located proximate to the sheath distal end. The carrier tube 620 may be inserted into the sheath 110 such that the anchor wire 1250 is disposed into the respective lumen (e.g., the lumen 623) defined by the carrier tube 620. Thus, the anchor wire 1250 may also serve to guide or facilitate movement of the carrier tube 620 towards the vessel V. The carrier tube 620 is inserted such that the anchor wire 1250 is axially offset from the first balloon 102 is axially offset from the anchor wire 1250.

At step 3, the anchor wire distal end 1251 is either inserted further into the vessel V or manipulated such that the anchor wire distal end 1251 forms the anchor 1252. At step 4, the sheath 110 along with the carrier tube 620, the first balloon 102, and the anchor wire 1250 is withdrawn from the tissue track until the anchor 1252 contacts an inner surface of a wall of the vessel V. This may alert the user that the sheath distal end is disposed outside the vessel V proximate to the opening O.

At step 5, the sheath 110 along with the carrier tube 620 is withdrawn out of the tissue track without withdrawing the first balloon 102 such that the first balloon 102 is disposed outside the central channel 111 and the lumen 121 proximate to the opening O. At step 6, the first balloon 102 is inflated outside the vessel V above the opening O such that the hemostasis layer 106 presses against an outer surface of the wall of the vessel V and closes the opening O. Inflating the first balloon 102 also causes the hemostasis layer 106 and the wall of the vessel V to be interposed between the first balloon 102 and the anchor 1252. The first balloon 102 is maintained in the inflated position for the time period (e.g., sufficient to cause the hemostasis layer 106 to adhere to the outer surface of the vessel V over the opening O.)

At step 7, the anchor wire 1250 is withdrawn from vessel V and in some embodiments, also the carrier tube 620 while the first balloon 102 is still inflated and applying pressure on the hemostasis layer 106. For example, the anchor wire 1250 may be manipulated to cause the anchor wire distal end 1251 to unfold, or the anchor wire 1250 may be withdrawn into the carrier tube 620, which may cause the anchor wire distal end 1251 to unfold and straighten so that the anchor wire 1250 can be withdrawn from the vessel V.

At step 8, the first balloon 102 is deflated, for example, by withdrawing the fluid from the balloon 102 via the balloon tube 104. At step 9, the balloon 102 is removed from the tissue track, for example, by withdrawing the balloon tube 104 and, thereby the deflated balloon 102 away from the vessel V (e.g., into the carrier tube 120 or along with carrier tube 120) such that the hemostasis layer 106 separates from the outer surface of the balloon 102 and remains adhered to the outer surface of the wall of the vessel V.

Figure 13:
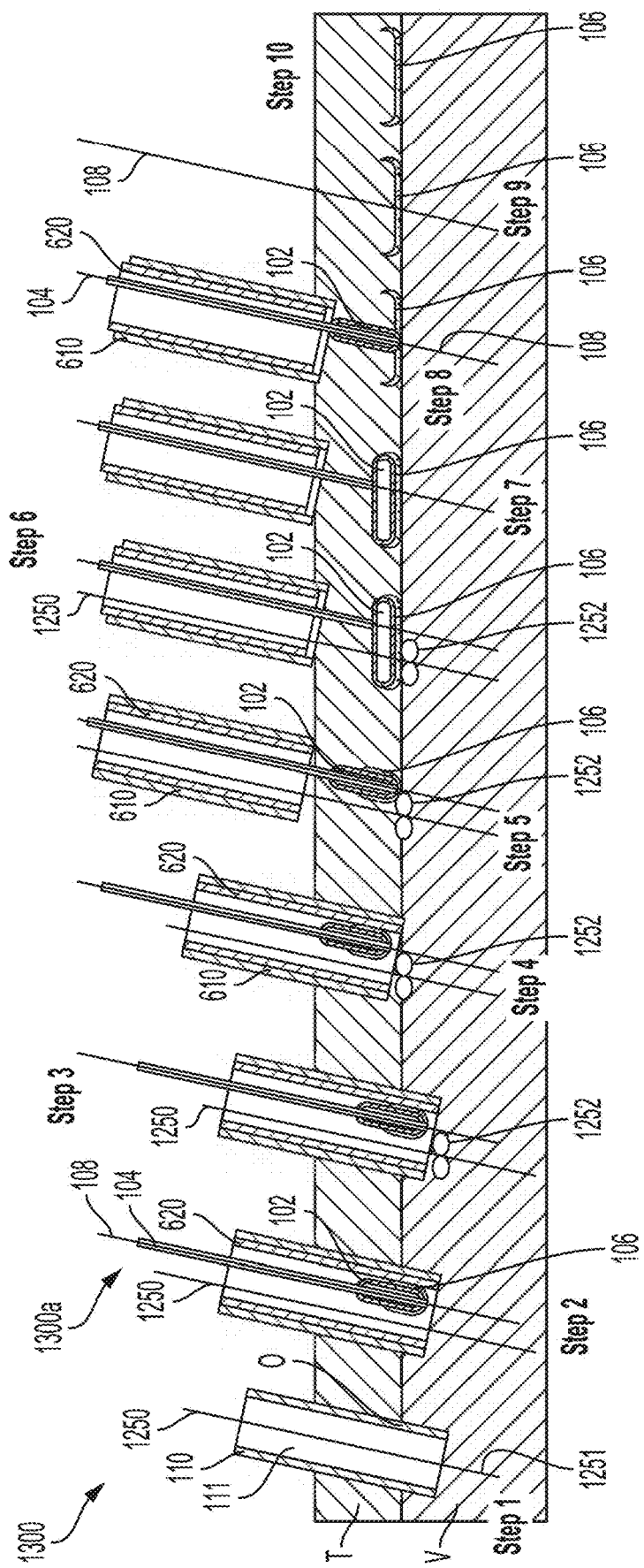
FIG. 13 illustrates a method for performing vascular hemostasis using a VCD that includes a sheath, balloon tube, a balloon, a hemostasis layer, a guide wire, and an anchor wire axially offset from the first balloon, according to an embodiment.

FIG. 13 illustrates another method 1300 for performing vascular hemostasis using a VCD 1300a that includes the sheath 110, the carrier tube 620, the first balloon tube 104, the first balloon 102, the first guide wire 108, the hemostasis layer 106, and an anchor wire 1250, according to an embodiment. The method 1300 is substantially similar to the method 1200 with the difference that a distal end of the first guide wire 108 is inserted into the vessel V before inserting the first balloon tube through the tissue track towards the opening O of the vessel V at step 2. Moreover, the first guide wire 108 is last to be withdrawn from the tissue track at step 9.

Figure 14:
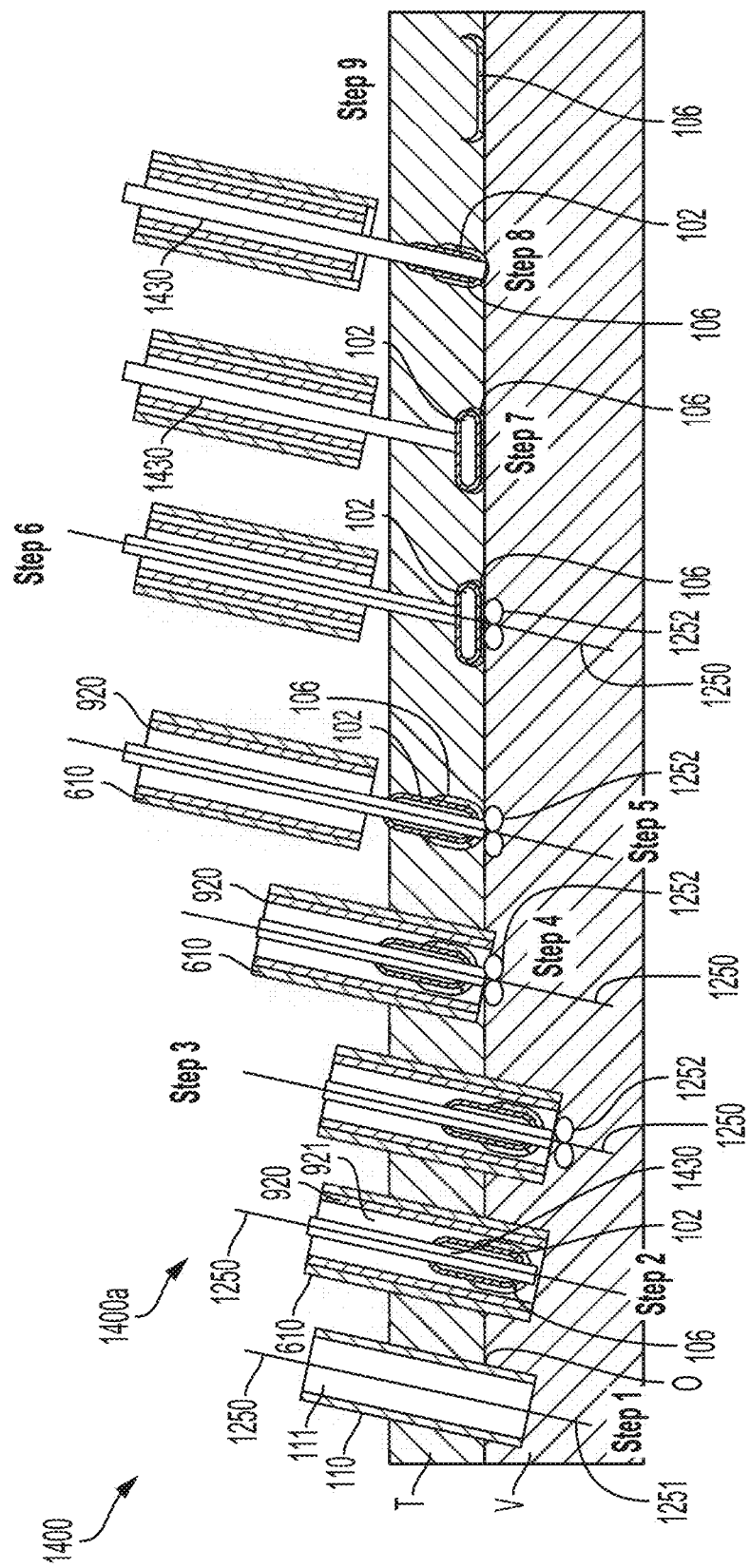
FIG. 14 illustrates a method for performing vascular hemostasis using a VCD that includes a sheath, a carrier tube, balloon tube, a balloon, a hemostasis layer, and an anchor wire axially aligned with the first balloon, according to an embodiment.

In some embodiment, the anchor wire 1250 may be axially aligned with the first balloon 102 such that the anchor wire 1250 is disposed through the first balloon 102. For example, FIG. 14 illustrates an example method 1400 for using a VCD 1400a to achieve vascular hemostasis. The VCD 1400a includes the sheath 110, a first balloon tube 930, the first balloon 102 fluidly coupled to the first balloon tube 1430 and having the hemostasis layer 106 disposed on at least a portion of an outer surface thereof, the first guide wire 108, the anchor wire 1250, and a carrier tube 620. The method 1400 is substantially similar to the method 900 but instead of the second balloon tube 624 being inserted through the first balloon tube 1430, the first balloon tube 1430 is inserted over the anchor wire 1450 such that the anchor wire at step 2 such that the anchor wire is co-axial or axially aligned with the first balloon tube 1430 (e.g., disposed through a lumen defined through the first balloon tube 1430).

FIGS. 15A and 15B are side views of an anchor 1552 coupled to an anchor wire 1550 for use in a VCD, for example, any of the VCDs described herein, in a first configuration and a second configuration, respectively, according to an embodiment. The anchor 1252 may include a flat plate or disk pivotally mounted on a pivot mount 1554 at distal end of the anchor wire 1550. The pivot mount 1554 may be located in a central portion of the anchor 1552. In the first configuration, the anchor 1252 is oriented parallel to the anchor wire 1550. This facilitates entry of the anchor 1552 into the opening of a vessel, as previously described. In the second configuration, the anchor 1552 pivots about its pivot mount 1554 such that anchor 1552 is oriented substantially parallel (e.g., at an angle in a range of about 0±5 degrees) with respect to a longitudinal axis of the vessel. In the second configuration, the anchor 1552 provides a back support for tamping of the hemostasis layer 106 as previously described. In some embodiments, the anchor 1552 may be moved between the first and second configurations via a biasing member or via external manipulation. In some embodiments, the VCD may include any suitable means for moving the anchor 1552 between the first configuration and the second configuration, to hold the anchor 1552 in place, and/or remove the anchor 1552 from the vessel.

FIG. 16A1 is a side view of an anchor 1652a mounted on an anchor wire 1650a for use in any of the VCDs described herein in a first configuration, and a FIG. 16A2 shows the anchor 1652a in a second configuration, according to an embodiment. The anchor 1652a may be formed from a flexible material or a shape memory alloy. In the first configuration, the anchor 1652a is bent away, i.e., defines a curvature such that a peripheral edges of the anchor 1652a are located distal from a vessel (i.e., proximate to a user) relative to a location of the anchor 1652a that is coupled to the anchor wire 1650a as the anchor wire 1650a is inserted into the vessel. This facilitates insertion of the anchor 1652a into the vessel. In the second configuration, the anchor 1652a is located within the vessel and is bent in an opposite direction to the first configuration so as to provide a back support for tamping the hemostasis layer in cooperation with the extravascular balloon, as well as facilitate removal of the anchor 1652a from the vessel.

The anchor 1652a may be maintained in the first configuration by a lumen of a carrier tube in which the anchor 1652a and the anchor wire 1650a is disposed. As the anchor 1652a emerges from the carrier tube into the vessel, the anchor 1652a moves into the second configuration (e.g., is biased to move into the second configuration). The anchor 1652a can then be withdrawn from the vessel via the carrier tube as the anchor wire 1650a is withdrawn from the vessel.

FIG. 16B1-16B2 shows an anchor wire 1650b configured to form an anchor 1652b, according to an embodiment. The anchor wire 1650b may be formed from a shape memory alloy. A distal end of the anchor wire 1650b includes a distal end first portion 1650b1 and a distal end second portion 1650b2. The distal end first and second portions 1650b1 and 1650b2 may be in contracted and linear configuration while being disposed within the carrier tube 1620b in a first configuration. As the anchor wire 1650b is linearly displaced within the carrier tube 1620b such that the distal end of the anchor wire 1650b emerges from the distal end of the carrier tube 1620b, the distal end first and second portions 1652b1 and 1652b2 bend in opposite directions to form the anchor 1652b in a second configuration as shown in FIG. 16B2.

FIGS. 17A-21B show top views and side views of various extravascular balloons for use with a VCD, according to various embodiments. For example, FIG. 17A shows a top view and FIG. 17B shows a side view of an extravascular balloon 1702 that is doughnut shaped. The doughnut shaped extravascular balloon may be configured to be disposed circumferentially around a balloon tube such that the balloon tube is disposed through the extravascular balloon 1702.

FIG. 18A shows a top view and FIG. 18B shows a side view of an extravascular balloon 1802 that is disk shaped. The extravascular balloon 1802 may be disposed at a distal end or on a sidewall of a balloon tube.

FIG. 19A shows a top view and FIG. 19B shows a side view of an extravascular balloon 1902 according to an embodiment. The balloon 1902 is generally disk shaped but additionally includes a slot 1904 defined through the balloon 1902. The slot 1904 is configured to accommodate a guide wire or in other embodiments, an anchor wire to be passed therethrough. In other embodiments, a balloon tube may be disposed through the slot 1904 and a sidewall of the balloon forming the slot 1904 may be coupled to an outer surface of the balloon tube.

FIG. 20A is a top view and FIG. 20B is a side view of an extravascular balloon 2002 that is tear drop shaped. The tear drop shaped extravascular balloon 2002 may facilitate application of compressive force on the opening of the vessel to obtain vascular closure.

FIG. 21A is a top view and FIG. 21B is a side view of an extravascular balloon 2102, according to another embodiment. The balloon 2102 has a generally cylindrical profile.

FIG. 22A shows a side perspective view of a balloon tube 2204 fluidly coupled to a balloon 2202 with the balloon 2202 in a deflated configuration, and FIG. 22B shows the perspective view of the balloon 2202 in an inflated configuration, according to an embodiment. The balloon 2202 is disposed circumferentially around the balloon tube 2204 such that the balloon tube 2204 is disposed through the balloon 2202. A hemostasis layer 2206 is disposed on an outer surface of a portion of the balloon 2202 that is located proximate to a distal end 2207 of the balloon tube 2204 such that the balloon tube 2204 is also disposed through the hemostasis layer 2206. In other embodiments, the balloon 2202 may be disposed on a distal end of the balloon tube 2204 such that the balloon tube 2204 is not disposed through the balloon 2202 or the hemostasis layer 2206. A port 2205 is defined in a sidewall of the balloon tube 2204 and is fluid communication with an internal volume of the balloon 2202. The balloon tube 2204 is configured to communicate a fluid into the balloon 2202 via the port 2205 to inflate the balloon 2202.

FIG. 23A shows a side view of a portion of a balloon tube 2304 fluidly coupled to an extravascular balloon 2302 with the balloon 2302 in a deflated configuration, and FIG. 23B shows the balloon 2302 in an inflated configuration, according to an embodiment. The balloon 2302 has a doughnut shaped cross-section and is disposed circumferentially around an outer surface of the balloon tube 2304.

Figure 24A:
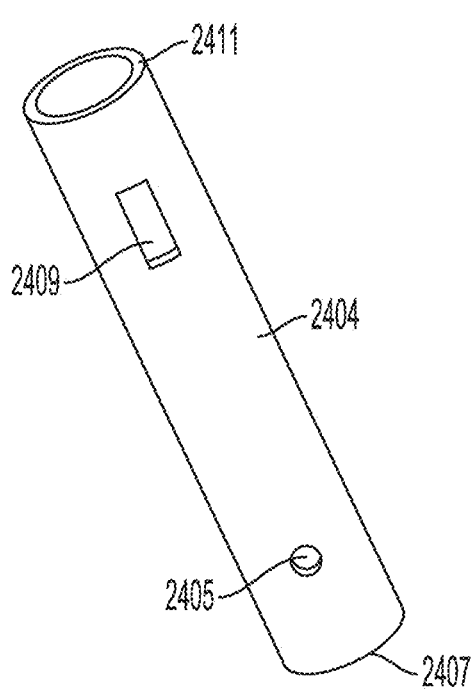
FIG. 24A is a top, front perspective view.
Figure 24B:
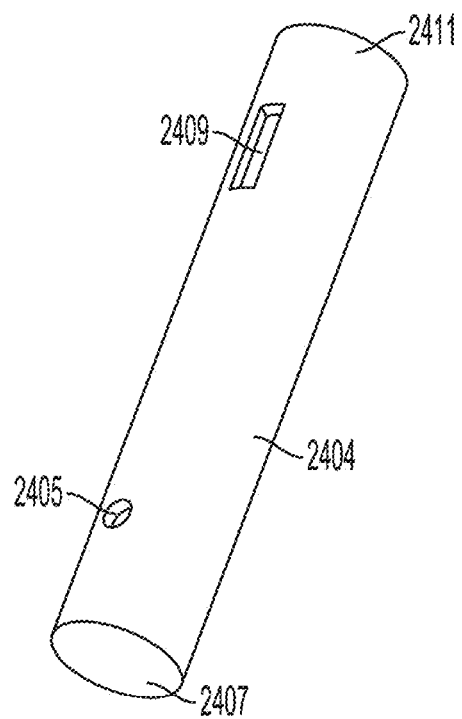
FIG. 24B is a bottom, front perspective view, and a FIG. 24C is back top perspective view of a balloon tube, according to an embodiment.
Figure 24C:
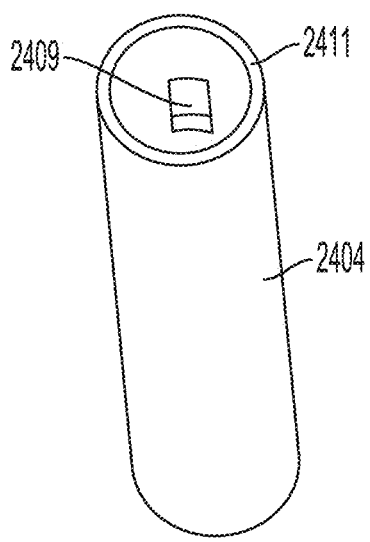

FIG. 24A is a top, front, perspective view, FIG. 24B is a bottom, front, perspective view, and a FIG. 24C is back, top, perspective view of a balloon tube 2404 configured to be used with any of the extravascular balloons or intravascular balloon described herein, according to an embodiment. The balloon tube 2404 defines a port 2405 on a sidewall thereof proximate to a distal end 2407 of the balloon tube 2404 through a which a fluid can be selectively communicated into or withdrawn out of a balloon coupled to the balloon tube 2404 for inflating or deflating the balloon, respectively. A slot 2409 may be defined in the sidewall of the balloon tube 2404 proximate to a proximal end 2411 of the balloon tube 2404 opposite the distal end 2407. An actuating member may be coupled to the slot 2409 to axially displace the balloon tube 2404, for example, to move the balloon tube 2404 towards an outer surface of a vessel for positioning an extravascular balloon proximate to an outer surface of the vessel, to insert the distal end 2407 through an opening formed in a wall of the vessel into the vessel, and/or withdraw the balloon tube 2404 from the vessel or from the tissue track.

Figure 25A:
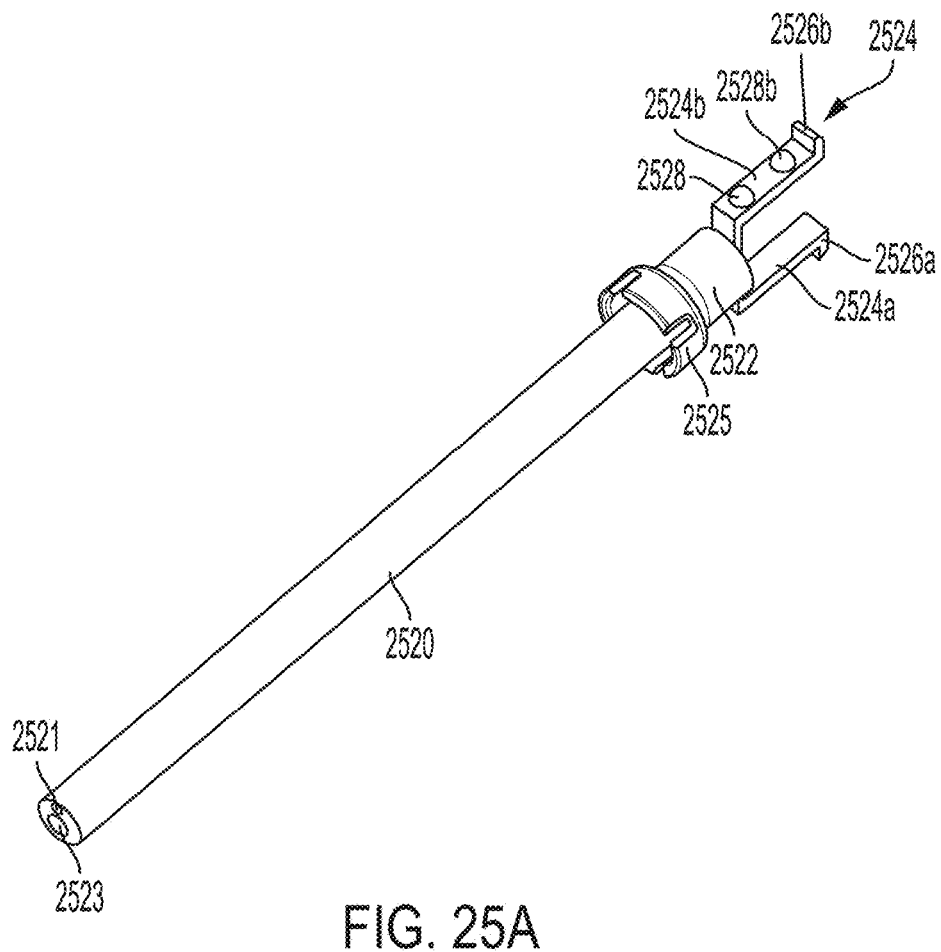
FIG. 25A is a top, front perspective view.
Figure 25B:
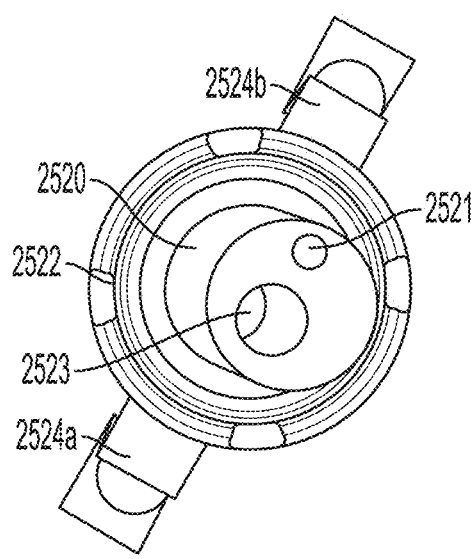
FIG. 25B is front view of a carrier tube, according to an embodiment.

FIG. 25A is a top, front perspective view, and FIG. 25B is a front view of a carrier tube 2520, according to an embodiment. As shown in FIGS. 25A-25B, the carrier tube 2520 is generally cylindrical member defining a first lumen 2521 and a second lumen 2523 adjacent to the first lumen 2521, axially therethrough. In some embodiments, a first balloon tube including an extravascular balloon may be linearly displaceable through the first lumen 2521, and a second balloon tube including a second balloon, or an anchor wire is linearly displaceable through the second lumen 2523. In other embodiments, a carrier tube having a single lumen may be used and the first balloon tube including the first balloon and the second balloon tube including the second lumen (e.g., axially aligned or axially offset from each other) are disposed through the single lumen.

A hub 2522 is coupled to a proximal end of the carrier tube 2520. The hub 2522 may include a plurality of arms 2525 extending axially from the hub 2522 towards the distal end of the carrier tube 2520. The plurality of arms 2525 may be disposed around the carrier tube 2520 radially spaced apart from an outer surface of the carrier tube 2520. In some embodiments, the plurality of arms 2525 may serve as snap fit arms to which a sheath (e.g., the sheath 110) may be coupled. In some embodiments, coupling of the sheath to the hub 2522 may allow the carrier tube 2520 to move synchronously with the sheath without any relative movement therebetween.

A coupling assembly 2524 is coupled to the hub 2522 and may be configured to couple the hub 2522 and thereby, the carrier tube 2520 to a handle used for operating a VCD including the carrier tube 2520. The coupling assembly 2524 may include a first coupling arm 2524a and a second coupling arm 2524a, each of which extends axially from the hub 2522 away from the carrier tube 2520. The first coupling arm 2524a is radially spaced apart from the second coupling arm 2524b. A first ledge 2526a and a second ledge 2526b extends radially away from a distal end of the first coupling arm 2524a and the second coupling arm 2524b and may be used to snap-fit the coupling arm to a handle (e.g., the handle assembly 2860 shown in FIGS. 28-29.) A plurality of detents 2528 may protrude from outer surfaces of each of the first and second coupling arms 2524a and 2524b and configured to mate with corresponding indents defined in the handle so as to secure the first and second coupling arms 2524a and 2524b to the handle. The first ledge 2526a and the second ledge 2526b may also be configured to be engaged by a user to release the coupling arms 2524a/b so as allow the coupling arms 2524a/b to be moved between a first position in which only a portion the detents 2528 engage a portion of the indents, or all of the detents 2528 engage corresponding indents. In this manner, a length that the carrier tube 2520 extends from the handle may be adjusted.

Figure 26:
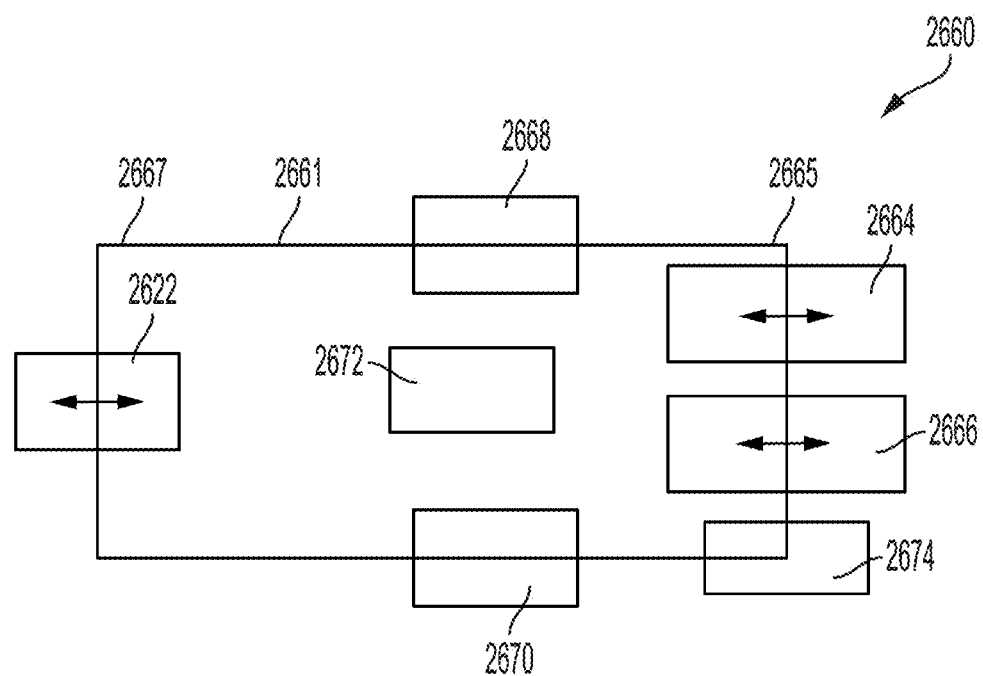
FIG. 26 is a schematic block diagram of a handle assembly that may be used with a VCD, according to an embodiment.

FIG. 26 is a schematic block diagram of a handle assembly 2660 that may be used with a VCD, according to an embodiment. The handle assembly 2660 includes a handle body 2661 within which various components of the handle assembly 2660 may be disposed. In some embodiments, a hub 2622 (e.g., the hub 2522) may be coupled to a distal end 2667 of the handle body 2661, for example, to a housing portion (not shown) of the handle assembly that is coupled to the handle main body 2661 (e.g., slidably coupled to the handle main body 2661).

As previously described, the hub 2622 may include a snap fit arms or prongs (e.g., the plurality of arms 2525) configured to be coupled to a sheath (e.g., the sheath 110), and a coupling assembly (e.g., the coupling assembly 2524) extending from a distal end of the hub 2622 towards the handle main body 2661 and configured to be coupled to the distal end 2667 of the handle main body 2661 (e.g., the coupling portion). In other embodiments, the hub 2622 may include threads, a friction fit mechanism, or any other suitable coupling mechanism for coupling the hub 2662 to the handle main body 2661.

The hub 2622 may be used to retract the sheath after insertion into the tissue track, for example, to expose the first balloon (e.g., an extravascular balloon) and/or the second balloon (e.g., an intravascular balloon). For example, in a first position the hub 2622 and thereby, the sheath is axially displaced away from the handle main body 2661 (e.g., via sliding the coupling portion) into the tissue track towards the vessel by a user. In a second position, the user can withdraw the hub 2622 towards the handle main body 2661 to move the sheath away from the vessel. In some embodiments, a user interface (e.g., a notch, a protrusion, a handle, etc.) may be provided in the handle assembly 2660 (e.g., in the coupling portion) to allow the user to slide the hub 2622 and, thereby the sheath towards or away from the vessel.

The handle assembly 2660 may also include a first actuator 2664 disposed proximate to a proximal end 2665 of the handle main body 2661. The first actuator 2664 may be coupled to a first balloon tube (e.g., an extravascular balloon tube) and configured to axially displace the first balloon tube and thereby, the first balloon towards or away from the vessel through sheath (e.g., through a carrier tube disposed within the sheath), for example, when engaged by a user or by a robotic actuator. Moreover, the handle assembly 2660 may also include a second actuator 2666 disposed proximate to the proximal end 2665 of the handle main body 2661 (e.g., parallel to the first actuator 2664). The second actuator 2666 may be coupled to a second balloon tube (e.g., an intravascular balloon tube) and configured to axially displace the second balloon tube and thereby, the second balloon towards or away from the vessel through sheath (e.g., through a carrier tube disposed within the sheath), for example, when engaged by a user or by a robotic actuator.

The first and second actuators 2664 and 2666 may be configured to lock the first and second actuators 2664 and 2666 in the proximal and distal positions so as to allow a user to manipulate the handle assembly while preventing the first and second balloon tubes from moving relative to the handle main body 2661. In some embodiments, the first balloon is at a fixed position relative to the second balloon so the first balloon is not be moved relative to the second balloon. In such embodiments, the second actuator 2666 may be excluded.

In some embodiments, the handle assembly 2660 may include a first balloon injector 2668 and a second balloon injector 2670 configured to be selectively activated for inflating the first and second balloons, respectively. Injector actuators (e.g., buttons, sliders, or any other suitable actuators) may be provided in the handle main body to be engaged by the user for activating the injectors 2668 and 2670.

In some embodiments, the handle assembly 2660 may also include a fluid reservoir 2672 provided within the handle main body 2661 within which the inflation fluid (e.g., saline) may be stored. In such embodiments, the handle assembly 2660 may include a fluid port 2674 through which the fluid is inserted into the fluid reservoir 2672. In some embodiments, the fluid port 2674 may include an attachment for a fluid delivery device (e.g., a syringe) in order to fill the reservoir 2672 with saline. The first and second balloon injectors 2668 and 2670 may be coupled to the reservoir 2672 and configured to be engaged by the user to draw fluid from the reservoir 2672 and communicate a predetermined volume of fluid into the first balloon and the second balloons, or withdraw fluid from the first and second balloons, respectively. The handle assembly 2660 may have a shape configured to allow a user to handle and operate the VCD by the holding the handle main body 2661.

In some embodiments, the handle assembly 2660 also interlocks or other locking mechanisms that may prevent a user from completing a later step while performing vascular closure, unless an earlier step in the vascular closure process has been completed. For example, a first interlock may be used to prevent the sheath slider from being retracted from a tissue track unless tension is applied on the handle assembly. This may prevent the extravascular first balloon from being deployed inside a vessel if the extravascular second balloon is not proximate to the wall of the vessel when the outer balloon is being exposed with the fabric in its deflated state over the vessel by retracting the sheath and/or the carrier tube. In some embodiments, a second interlock may prevent the first balloon injector 2668 from being engaged by a user unless tension is applied to the handle main body 2661. This may prevent inflation of the extravascular first balloon so as to prevent the first balloon from being accidentally deployed and inflated within the vessel if the intravascular balloon is not pulled against the vessel. In some embodiments, a third interlock may prevent the coupling portion of the handle assembly and, thereby the sheath and carrier tube from being advanced unless tension is held on the handle assembly 2660. This may prevent the user from pressing the extravascular first balloon against an outer surface of the vessel because the first balloon may be actually disposed within the vessel and may be accidentally deployed within the vessel.

Figure 27:
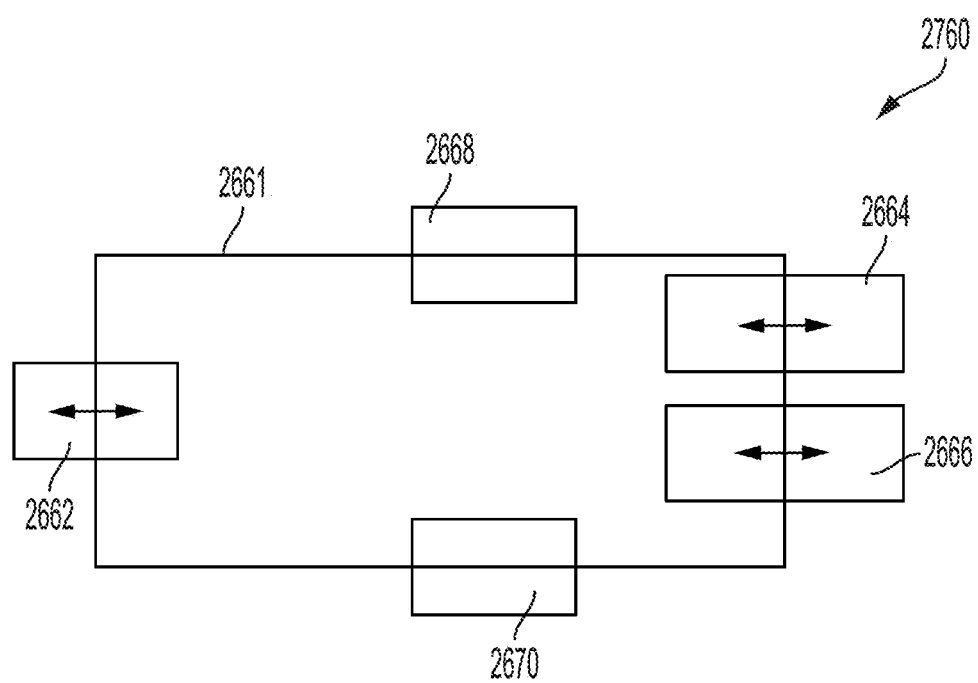
FIG. 27 is a schematic block diagram of a handle assembly that may be used with a VCD, according to another embodiment.

FIG. 27 is a schematic block diagram of a handle assembly 2760 that may be used with a VCD, according to another embodiment. The handle assembly 2760 is substantially similar to the handle assembly 2660 with the difference that the handle assembly 2760 does not include a reservoir and a fluid port. In such embodiments, the inflation fluid may be communicated into the handle assembly via fluid communication tubes or conduits from an external reservoir.

Figure 28A:
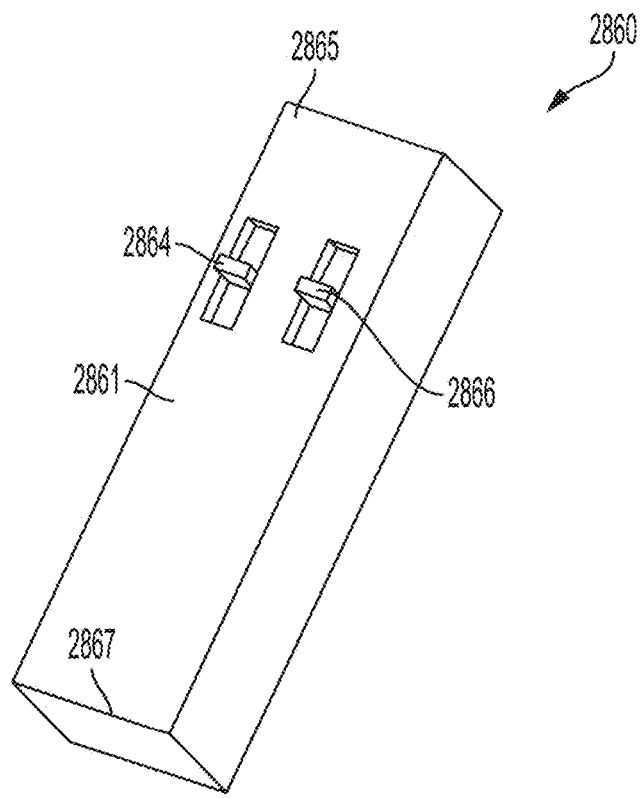
FIG. 28A is a bottom, front, side perspective view of a handle assembly, according to an embodiment.
Figure 28B:
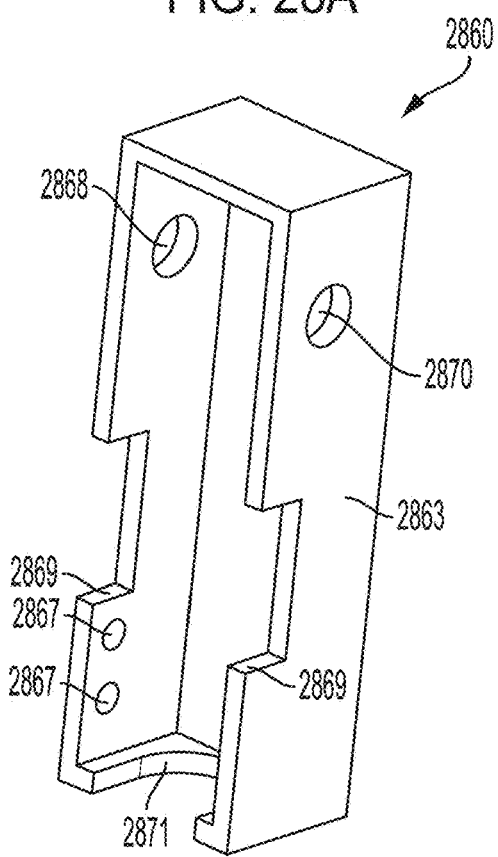
FIG. 28B is a top, front, side perspective view of a coupling portion included in the handle assembly of FIG. 28A, according to an embodiment.
Figure 29B:
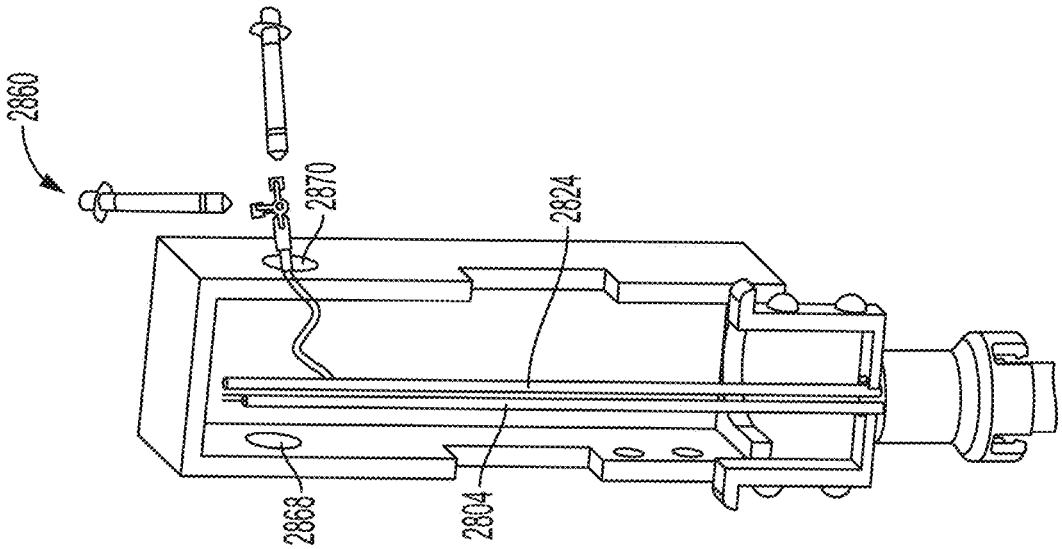
FIG. 29B shows the first balloon tube and the second balloon tube in a second configuration, according to an embodiment.
Figure 29A:
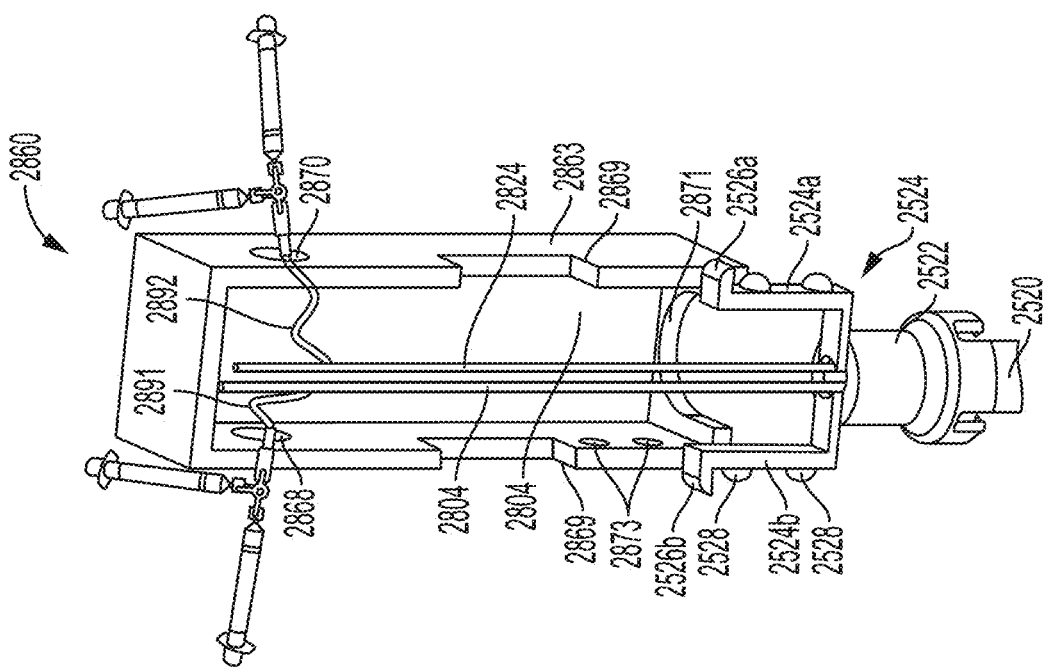
FIG. 29A shows a first balloon tube and a second balloon tube disposed through an internal volume of the coupling portion of FIG. 28B in a first configuration.

FIG. 28A-29B are various views of a handle assembly 2860, according to another embodiment. The handle assembly 2860 includes a handle main body 2861 and a coupling portion 2863 that may be slidably disposed within the handle main body 2861. As shown in FIG. 28A, a first actuator 2864 and a second actuator 2866 is disposed proximate to a proximal end 2865 of the handle main body 2861. The first and second actuators 2866 and the second actuator 2866 may include sliders or any other suitable actuators that are coupled to a first balloon tube 2804 and a second tube 2824, which may be a second balloon tube as shown in FIG. 29A, or a tube for supporting an anchor wire as shown in FIG. 29B, and configured to move the tubes 2804 and 2824 (FIG. 29A), or the anchor wire disposed within the second tube 2824 (FIG. 29B), respectively towards or away from the vessel.

The coupling portion 2863 defines a slot 2871 at an end wall thereof that is proximate to a distal end 2867 of the handle main body 2861. The slot 2871 is configured to receive a portion of the hub 2522. The coupling portion 2863 also defines a set of notches 2869 on opposing sidewalls thereof that are orthogonal to the end wall defining the slot 2871. The set of notches 2869 may be configured to allow corresponding ledges 2526a/b to snap-fit thereto so as to removably couple the first and second coupling arms 2524a/b, and thereby the hub 2522 and the carrier tube 2520 and sheath (e.g., the sheath 110), to the coupling portion 2863. Moreover, indents 2873 may be defined in a portion of the sidewalls of the handle main body 2861 that is proximate to the slot 2871. The indents 2873 may be configured to receive the detents 2528 for securing the coupling arms 2524a within the coupling portion 2863 so as to prevent motion of the coupling assembly 2524 and thereby, the hub 2522 relative to the coupling portion 2863.

In some embodiments, the first port 2868 may be defined in a first sidewall and a second port 2870 may be defined in an opposing sidewall of the coupling portion. Fluid communication lines 2891 and 2892 may be introduced through the first port 2868 and second port for inserting or withdrawing fluid from the first and second balloon via the first balloon tube 2804 and the second balloon tube 2824, respectively.

In some embodiments, the coupling portion 2863 may be slideable within the handle main body 2861. In other embodiments, the coupling portion 2863 is integrally formed with the handle main body 2861, and a separate cover including the actuators 2864 and 2866 may be disposed over the handle main body 2861.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

The term "fluidly coupled" means that fluid can flow between two components that are coupled to each other.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A device for performing vascular hemostasis, comprising:
   a first balloon tube;
   a first balloon that is directly coupled to the first balloon tube and is insertable into a tissue track so as to be disposed outside a vessel above an opening formed in the vessel, wherein the first balloon is selectively inflatable via the first balloon tube;
   a hemostasis layer removably disposed on at least a portion of an outer surface of the first balloon;
   a second balloon tube;
   a second balloon that is directly coupled to the second balloon tube and is configured to be removably disposed through the opening within the vessel, wherein the second balloon is selectively inflatable via the second balloon tube;
   a carrier tube defining:
      a first lumen through which the first balloon, the hemostasis layer, and the first balloon tube are moveably disposed, and
      a second lumen through which the second balloon and the second balloon tube are movably disposed, the second lumen having an axis that is offset from an axis of the first lumen;
   a first guide wire extending through or adjacent to the first balloon, a distal end of the first guide wire configured to be removably disposed through the opening within the vessel before disposing the first balloon over the opening; and
   a second guide wire extending through or adjacent to the second balloon, a distal end of the second guide wire configured to be removably disposed in the vessel before disposing the second balloon within the vessel,
   wherein the first balloon is inflatable above the opening and the second balloon is inflatable within the vessel such that a wall of the vessel and the hemostasis layer are interposed between the first balloon and the second balloon, thereby facilitating securing of the hemostasis layer on an outer surface of the vessel, the hemostasis layer is disposed on the outer surface of the vessel and closes the opening, and the first balloon exerts pressure on the opening to achieve hemostasis, the hemostasis layer being separable from the first balloon so as to remain disposed on the outer surface of the vessel when the first balloon is removed from the tissue track and to continue to close the opening after removal of the first balloon.

2. The device of claim 1, further comprising:
   a sheath defining a central channel through which the first balloon, the hemostasis layer, the first balloon tube, the second balloon, the second balloon tube, and the carrier tube are disposed,
   wherein at least a portion of the sheath is configured to be removably insertable into the tissue track and the vessel.

3. The device of claim 2, wherein a distal end of at least one of the sheath or the carrier tube is perforated so as to allow the distal end to tear at the perforations when the first balloon is inflated within the distal end.

4. The device of claim 1, wherein the hemostasis layer is formed of a resorbable material.

5. The device of claim 1, wherein the second balloon is axially offset from the first balloon.

6. A method for performing vascular hemostasis, comprising:
providing a carrier tube defining a first lumen through which a first balloon, a hemostasis layer, and a first balloon tube are movably disposed and a second lumen through which a second balloon and a second balloon tube are movably disposed, the second lumen having an axis that is offset from an axis of the first lumen, wherein the first balloon tube is directly coupled to the first balloon, and the hemostasis layer is disposed on at least a portion of an outer surface of the first balloon;
inserting a first guide wire through a tissue track until a distal end of the first guide wire is disposed through an opening formed in a vessel;
inserting a second guide wire through the tissue track until a distal end of the second guide wire is disposed through the opening;
inserting the carrier tube, together with the first balloon, the hemostasis layer, and the first balloon tube and the second balloon and the second balloon tube, through the tissue track towards the opening formed in a vessel, such that the first balloon extends through or adjacent to the first guide wire, and the second guide wire extends through or adjacent to the second balloon;
advancing the second balloon tube through the second lumen until the second balloon is disposed within the vessel;
inflating the second balloon within the vessel;
withdrawing the carrier tube from the tissue track until the second balloon contacts an inner surface of a wall of the vessel;
advancing the first balloon tube through the first lumen until the first balloon is disposed outside the vessel above the opening formed in the vessel;
withdrawing the carrier tube away from the vessel without withdrawing the first balloon such that the first balloon is disposed proximate to the opening formed in the vessel;
inflating the first balloon such that a wall of the vessel and the hemostasis layer are interposed between the inflated first balloon and the inflated second balloon such that the hemostasis layer closes the opening;
maintaining the first balloon in the inflated position for a first time period;
maintaining the second balloon in the inflated position for a second time period;
deflating the second balloon after the second time period while maintaining the first balloon in the inflated position;
withdrawing the second balloon tube and, thereby the second balloon from the vessel;
deflating the first balloon after the first time period such that the hemostasis layer separates from the outer surface of the first balloon, remains disposed on the outer surface of the vessel, and continues to close the opening once the first balloon is removed from the tissue track; and
withdrawing the first balloon tube and, thereby the first balloon out of the vessel.

7. The method of claim 6, wherein the second balloon is axially offset from the first balloon.

8. The method of claim 6, further comprising:
before removing the first balloon from the tissue track, removing the first guide wire from the tissue track.

9. The method of claim 8, further comprising:
before inserting the carrier tube, inserting a sheath through the tissue track over the first guide wire such that a portion of the sheath is inserted through the opening formed in the vessel into the vessel, the sheath defining a central channel through which the carrier tube is inserted towards the vessel;
withdrawing the sheath until a sheath distal end of the sheath is disposed outside the vessel proximate to the opening; and
after inflating the second balloon, withdrawing the sheath a distance without withdrawing the first balloon such that the first balloon is disposed outside the central channel proximate to the opening.

10. A device for performing vascular hemostasis, comprising:
a first balloon tube;
a first balloon that is directly coupled to the first balloon tube and is insertable into a tissue track so as to be disposed outside a vessel above an opening formed in the vessel, wherein the first balloon is selectively inflatable via the first balloon tube;
a hemostasis layer removably disposed on at least a portion of an outer surface of the first balloon;
a second balloon tube;
a second balloon that is directly coupled to a distal end of the second balloon tube and is configured to be removably disposed through the opening within the vessel, wherein the second balloon is selectively inflatable via the second balloon tube and axially aligned with the first balloon, the first balloon tube defining at least one lumen through which the second balloon and the second balloon tube are moveably disposed; and
a carrier tube defining a single lumen through which the first balloon, the hemostasis layer, the first balloon tube, the second balloon, and the second balloon tube are moveably disposed;
wherein the first balloon is inflatable above the opening and the second balloon is inflatable within the vessel such that a wall of the vessel and the hemostasis layer are interposed between the first balloon and the second balloon, thereby facilitating securing of the hemostasis layer on the outer surface of the vessel, the hemostasis layer is disposed on the outer surface of the vessel and closes the opening, and the first balloon exerts pressure on the opening to achieve hemostasis, the hemostasis layer being separable from the first balloon so as to remain disposed on the outer surface of the vessel when the first balloon is removed from the tissue track and to continue to close the opening after removal of the first balloon.

* * * * *